US012416873B2

(12) United States Patent
Takeda

(10) Patent No.: US 12,416,873 B2
(45) Date of Patent: Sep. 16, 2025

(54) TONER, TONER CARTRIDGE, IMAGE FORMING APPARATUS

(71) Applicant: TOSHIBA TEC KABUSHIKI KAISHA, Tokyo (JP)

(72) Inventor: Yuichiro Takeda, Fuji Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 898 days.

(21) Appl. No.: 17/592,122

(22) Filed: Feb. 3, 2022

(65) Prior Publication Data

US 2022/0365455 A1 Nov. 17, 2022

(30) Foreign Application Priority Data

May 17, 2021 (JP) ................................ 2021-083104

(51) Int. Cl.

| | |
|---|---|
| ***G03G 9/087*** | (2006.01) |
| ***G03G 9/08*** | (2006.01) |
| ***G03G 9/09*** | (2006.01) |
| ***G03G 15/08*** | (2006.01) |

(52) U.S. Cl.

CPC ....... *G03G 9/08755* (2013.01); *G03G 9/0804* (2013.01); *G03G 9/0902* (2013.01); *G03G 15/0822* (2013.01)

(58) Field of Classification Search

CPC ........... G03G 9/09725; G03G 9/09716; G03G 9/09708; G03G 9/08782

See application file for complete search history.

(56) References Cited

U.S. PATENT DOCUMENTS

| | | | |
|---|---|---|---|
| 9,097,997 | B2 | 8/2015 | Nomura et al. |
| 9,529,293 | B2 | 12/2016 | Fujisaki et al. |
| 10,078,284 | B2 | 9/2018 | Kuroyama |
| 10,591,829 | B2 | 3/2020 | Katsumata |
| 2018/0129147 | A1 | 5/2018 | Uchino et al. |
| 2018/0143550 | A1 | 5/2018 | Sugawara et al. |

FOREIGN PATENT DOCUMENTS

| | | | |
|---|---|---|---|
| EP | 3062154 | A1 | 8/2016 |
| JP | 2002214823 | A | 7/2002 |
| JP | 2002296829 | A | 10/2002 |

(Continued)

OTHER PUBLICATIONS

Translation of JP 2015-176038.*

(Continued)

*Primary Examiner* — Peter L Vajda

(74) *Attorney, Agent, or Firm* — Kim & Stewart LLP

(57) ABSTRACT

A toner is comprised of toner particles and external additive adhering to the surface of the toner particles. The toner particles are formed from a binder resin, an ester wax, and a colorant. The external additive comprises a titanium oxide and silica. A first adhesive strength between the external additive and the toner base particles is in a range of 90 to 100% when measured as a ratio of X-ray spectroscopic intensity of titanium for toner particles before and after a washing process, and a second adhesive strength between the external additive and the toner base particles is in a range of 50 to 80% when measured as a ratio of X-ray spectroscopic intensity of silicon measured for toner before and after another washing process.

19 Claims, 5 Drawing Sheets

(56) References Cited

FOREIGN PATENT DOCUMENTS

| | | | | | |
|---|---|---|---|---|---|
| JP | 2006058502 | A | | 3/2006 | |
| JP | 2006235588 | A | | 9/2006 | |
| JP | 2014178531 | A | | 9/2014 | |
| JP | 2015125302 | A | | 7/2015 | |
| JP | 2015-176038 | | * | 10/2015 | ............... G03G 9/08 |
| JP | 2015210382 | A | | 11/2015 | |
| JP | 2017003844 | A | | 1/2017 | |
| JP | 2017009621 | A | | 1/2017 | |
| WO | WO 2012/029611 | | * | 3/2012 | ............... G03G 9/08 |
| WO | 2013115409 | A1 | | 8/2013 | |

OTHER PUBLICATIONS

Extended European Search Report dated Aug. 26, 2022, mailed in counterpart European Application No. 22162566.8, 7 pages.

Japanese Office Action dated Oct. 22, 2024, mailed in counterpart Japanese Application No. 2021-083104, 8 pages (with translation).

* cited by examiner

TONER, TONER CARTRIDGE, IMAGE FORMING APPARATUS

CROSS-REFERENCE TO RELATED APPLICATION

This application is based upon and claims the benefit of priority from Japanese Patent Application No. 2021-083104, filed May 17, 2021, the entire contents of which are incorporated herein by reference.

FIELD

Embodiments described herein relate generally to a toner, a toner cartridge for providing a toner, and an image forming apparatus incorporating a toner cartridge providing a toner.

BACKGROUND

For electrophotographic image forming apparatus systems utilizing toners, it has been proposed to collect the toner remaining on a photoconductor element (e.g., a photoconductor drum) after transfer of the toner image from the photoconductor element and return the collected toner to a developing device for later reuse, However, when the toner remaining on the photoconductor is reused in this manner, the toner may be either be depleted in some components relative to unused ("fresh") toner or potentially contaminated with external additives or the like. Thus, when reused toner is returned to the developing device, performance, such as chargeability of the toner, may change relative to fresh toner. Thus, there may be more problems with image defects such as image fog and/or white streaks when toner is reused.

DETAILED DESCRIPTION

Figure 1:
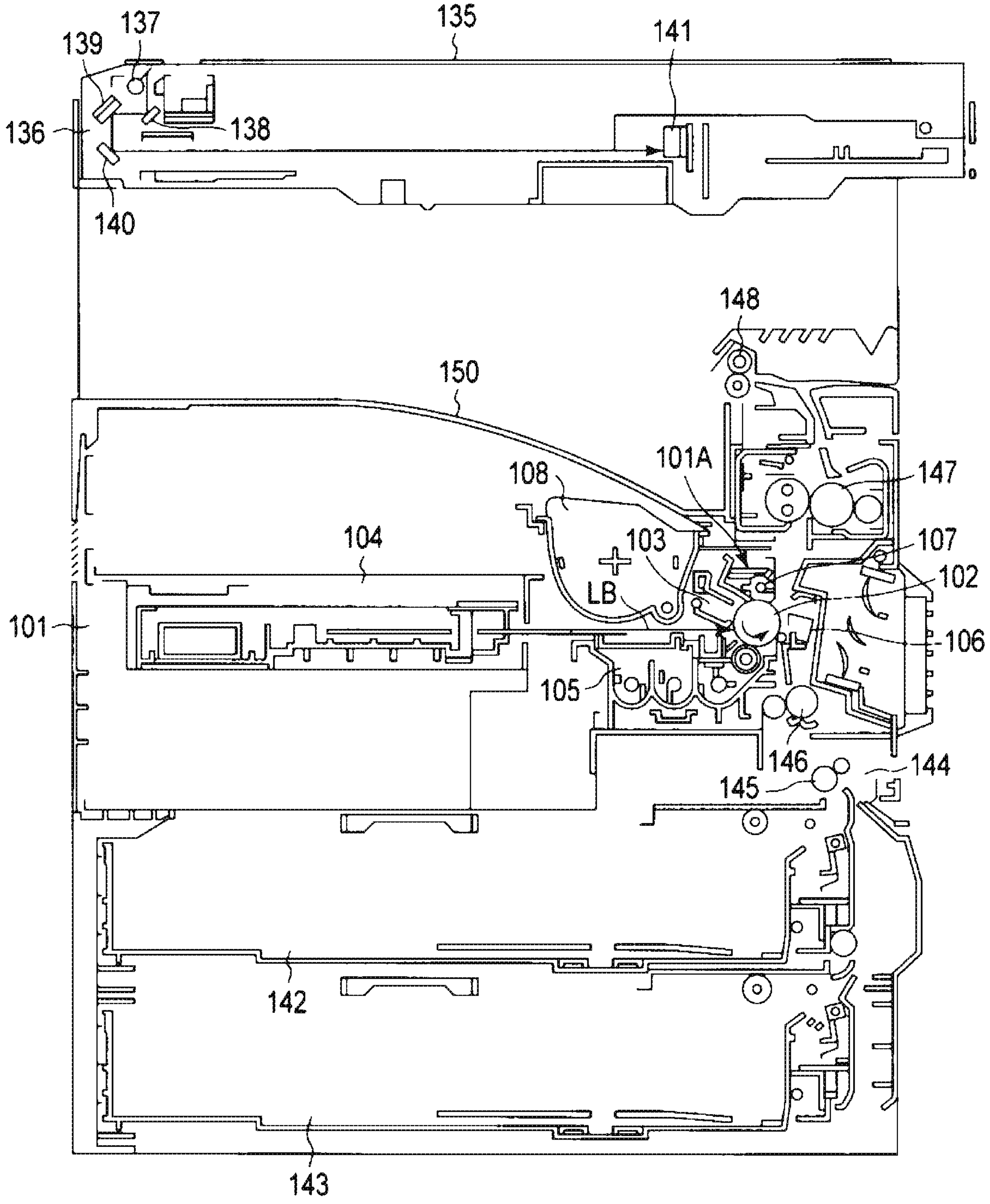
FIG. 1 depicts a schematic structure of an image forming apparatus according to an embodiment.

In general, according to certain embodiments, there is provided a toner with which image defects are less likely to occur even when reused, a toner cartridge for containing such a toner, and an image forming apparatus in which such a toner cartridge (and toner) can be incorporated.

According to one embodiment, a toner comprises toner base particles and an external additive adhering to the surface of the toner base particles. The toner base particles comprise a binder resin, an ester wax, and a colorant. The external additive comprises a titanium oxide (e.g., strontium titanate, titanium dioxide) and a silica. The toner has a first adhesive strength between the external additive and the toner base particles that is in a range of 90 to 100% when measured as a ratio $I_{a1}/I_{a2}$ multiplied by 100, where $I_{a2}$ is an X-ray intensity of titanium measured for toner base particles processed as follows in a first processing: an aqueous liquid containing the toner is shaken for 5 minutes at 25° C. and 200 rpm, desorbed external additive is removed by centrifugation, and then remaining toner base particles are dried before measurement of X-ray intensity, and $I_{a1}$ is an X-ray intensity of titanium measured for toner base particles not processed according to the first processing. The toner has a second adhesive strength between the external additive and the toner base particles that is in a range of 50 to 80% when measured as a ratio $I_{b1}/I_{b2}$ multiplied by 100, where $I_{b2}$ is an X-ray intensity of silicon measured for toner base particles processed as follows in a second processing: an aqueous liquid containing the toner is sonicated at 25° C., 28 kHz, 55 W, desorbed external additive is removed by centrifugation, and then remaining toner base particles are dried before measurement of X-ray intensity, and $I_{b1}$ is an X-ray intensity of silicon measured for toner base particles not processed according to the second processing.

A toner of an embodiment has toner mother particles and an external additive. The external additive is attached to the surface of the toner mother particle. The toner mother particles contain a binder resin, an ester wax, and a colorant. The external additive contains a titanium oxide and a silica. An adhesive strength (type A) of the external additive to the toner mother particles is in a range of 90 to 1000.

The adhesive strength (type A) is calculated by the following Formula (1):

$$\text{Adhesive strength (type } A)=(I_{a2}/I_{a1})\times 100$$

In Formula (1), $I_{a1}$ is an X-ray intensity of titanium measured for the unprocessed toner particles, and $I_{a2}$ is an X-ray intensity of titanium measured for toner particles obtained by the following method (Method A). In method A, an aqueous liquid containing the toner and water is stirred for 5 minutes under conditions of 25° C. and 200 rpm (stirring speed), desorbed external additive is then removed by centrifugation, and then the particles (referred to as particles group A) are obtained by drying.

The adhesive strength (type B) of the external additive to the toner mother particles is in a range of 50 to 80%. The adhesive strength (type B) is calculated by the following Formula (2):

$$\text{Adhesive strength (type } B)=(I_{b2}/I_{b1})\times 100$$

In Formula (2), $I_{b1}$ is an X-ray intensity of silicon measured for the unprocessed toner particles, and $I_{b2}$ is an X-ray intensity of silicon measured for toner particles obtained by the following method (method B). In method B, an aqueous liquid containing the toner particles and water is sonicated under conditions of 25° C., 28 kHz and 55 W, desorbed external additive is then removed by centrifugation, and the particles (referred to as particles group B) are obtained by drying.

Hereinafter, a toner of an embodiment will be described. The toner of the embodiment includes toner mother particles and an external additive. In the toner of an embodiment, an adhesive strength (type A) and an adhesive strength (type B) of the external additive on the toner mother particles are within specific ranges. Therefore, image defects such as image fog and white streaks are less likely to occur.

The toner mother particles (toner base particles) of the embodiment contain a binder resin, an ester wax, and a colorant. The toner mother particles may further contain components other than the binder resin, ester wax and colorant as long as the effects disclosed in the embodiment can be obtained.

The binder resin is preferably at least partially a crystalline polyester resin. That is, it is preferable to use a crystalline polyester resin and a binder resin other than the crystalline polyester resin in combination as the binder resin.

When at least a part of the binder resin is a crystalline polyester resin, the low temperature fixability of the toner is improved.

The crystalline polyester resin functions as a binder resin. In the following description, a polyester resin having a ratio of the softening temperature to the melting temperature (softening temperature/melting temperature) of 0.8 to 1.2 is referred to as a "crystalline polyester resin". A polyester resin having a ratio of the softening temperature to the melting temperature (softening temperature/melting temperature) of less than 0.8 or more than 1.2 is referred to as a "non-crystalline polyester resin".

Examples of the crystalline polyester resin include a condensation polymer of a divalent or higher alcohol and a divalent or higher carboxylic acid.

Examples of divalent or higher alcohols include ethylene glycol, 1,2-propylene glycol, 1,3-propylene glycol, 1,4-butanediol, 1,5-pentanediol, 1,6-hexanediol, neopentyl glycol, 1,4-butenediol, polyoxypropylene, polyoxyethylene, glycerin, pentaerythritol, trimethylolpropane, and the like. As the divalent or higher alcohol, 1,4-butanediol and 1,6-hexanediol are preferable.

Examples of divalent or higher carboxylic acids include adipic acid, oxalic acid, malonic acid, maleic acid, fumaric acid, citraconic acid, itaconic acid, glutaconic acid, succinic acid, phthalic acid, isophthalic acid, terephthalic acid, sebacic acid, azelaic acid, succinic acid substituted with an alkyl group or an alkenyl group, cyclohexanedicarboxylic acid, trimellitic acid, pyromellitic acid, acid anhydrides thereof, and esters thereof.

Examples of the succinic acid substituted with an alkyl group or an alkenyl group include succinic acid substituted with an alkyl group or an alkenyl group having 2 to 20 carbon atoms. For example, n-dodecenyl succinic acid, n-dodecyl succinic acid, and the like can be mentioned. As the divalent or higher carboxylic acid, fumaric acid is preferable.

The crystalline polyester resin is not limited to condensation polymers of the divalent or higher alcohol and the divalent or higher carboxylic acid exemplified here. Additionally, any one of the crystalline polyester resins may be used alone, or in combination with one or more of the other crystalline polyester resins.

The mass average molecular weight of the crystalline polyester resin is preferably $6\times10^3$ to $18\times10^3$, and more preferably $8\times10^3$ to $14\times10^3$. When the mass average molecular weight of the crystalline polyester resin is equal to or greater than the lower limit value, the low temperature fixability of the toner is improved. Further, when the mass average molecular weight of the crystalline polyester resin is equal to or less than the upper limit value, the toner is excellent in storage stability and low temperature offset resistance.

In the present specification, the mass average molecular weight is a polystyrene-equivalent value obtained by gel permeation chromatography. Molecular weights are generally presented as unitless values, but can also be considered to be atomic mass units (a.m.u) or Daltons (Da).

The melting point of the crystalline polyester resin is preferably within a range of 60 to 120° C., more preferably within a range of 70 to 115° C., and even more preferably within a range 80 to 110° C. When the melting point of the crystalline polyester resin is equal to or greater than the lower limit value, the toner is excellent in storage stability and heat resistance. When the melting point of the crystalline polyester resin is equal to or less than the upper limit value, the low temperature fixability of the toner is improved.

The melting point of the crystalline polyester resin can be measured, for example, by a differential scanning calorimetry (DSC).

Examples of other binder resins include non-crystalline polyester resin, styrene resin, ethylene resin, acrylic resin, phenol resin, epoxy resin, allyl phthalate resin, polyamide resin, maleic acid resin, and the like. However, the other binder resins are not limited to these examples.

Any one of the other binder resins may be used alone, or two or more thereof may be used in combination.

As the other binder resin, a non-crystalline polyester resin is preferable from the viewpoint that the effect disclosed in the embodiment can be easily obtained. Examples of the non-crystalline polyester resin include a condensation polymer of a divalent or higher carboxylic acid and a divalent alcohol.

Examples of the divalent or higher carboxylic acid include a divalent or higher carboxylic acid, an acid anhydride of a divalent or higher carboxylic acid, and an ester of a divalent or higher carboxylic acid. Examples of the ester of a divalent or higher carboxylic acid include a lower alkyl (number of carbon atoms in a range of 1 to 12) ester of a divalent or higher carboxylic acid.

Examples of the divalent alcohol include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, alkylene oxide adduct of bisphenol A, and the like. However, the divalent alcohol is not limited to these examples.

Examples of the alkylene oxide adduct of bisphenol A include compounds in which an average of 1 to 10 mol of alkylene oxide having 2 to 3 carbon atoms is added to bisphenol A. Examples of the alkylene oxide adduct of bisphenol A include polyoxypropylene(2.2)-2,2-bis(4-hydroxyphenyl)propane, polyoxypropylene(3.3)-2,2-bis(4-hydroxyphenyl) propane, polyoxyethylene(2.0)-2,2-bis(4-hydroxyphenyl) propane, polyoxypropylene (2.0)-polyoxyethylene(2.0)-2,2-bis(4-hydroxyphenyl)propane, polyoxypropylene (6)-2,2-bis(4-hydroxyphenyl)propane, and the like.

As the divalent alcohol, an alkylene oxide adduct of bisphenol A is preferable. Any one of the divalent alcohols may be used alone, or two or more thereof may be used in combination.

Other binder resins can be obtained, for example, by polymerizing vinyl polymerizable monomers alone or in a plurality of kinds.

Examples of the vinyl polymerizable monomer include aromatic vinyl monomers, ester monomers, carboxylic acid-containing monomers, and amine monomers.

Examples of the aromatic vinyl monomer include styrene, methylstyrene, methoxystyrene, phenylstyrene, chlorostyrene, and derivatives thereof.

Examples of the ester monomer include methyl acrylate, ethyl acrylate, butyl acrylate, methyl methacrylate, ethyl methacrylate, butyl methacrylate, and derivatives thereof.

Examples of the carboxylic acid-containing monomer include acrylic acid, methacrylic acid, fumaric acid, maleic acid, and derivatives thereof.

Examples of the amine monomer include aminoacrylate, acrylamide, methacrylamide, vinylpyridine, vinylpyrrolidone, and derivatives thereof.

Other binder resins may be obtained by polycondensation of a polymerizable monomer component composed of an alcohol component and a carboxylic acid component. In the polycondensation of the polymerizable monomer component, various auxiliaries such as a chain transfer agent, a cross-linking agent, a polymerization initiator, a surfactant, a flocculant, a pH adjuster, and an antifoaming agent may be used.

Ester wax is an ester compound that functions as a mold release agent. As the ester wax, the following described specific ester wax ("ester wax α") is preferable from the viewpoint of heat resistance and storage stability of the toner.

Ester wax α is a condensation polymer of a first monomer group including at least three or more different kinds of carboxylic acid molecules and a second monomer group including of at least two different kinds of alcohol molecules.

The ester wax α is composed of two or more different kinds of ester compounds.

Regarding the ester wax α, the first monomer group will be described.

From the viewpoint that the ester wax α can be more easily obtained, the number of different kinds of carboxylic acid in the first monomer group is preferably 7 or less, more preferably 5 or less, even more preferably 4 or less.

Here, the number of carbon atoms of the carboxylic acid molecule that provides the maximum (highest) content level (on a mass basis) within the first monomer group is defined as $C_n$. The number of carbon atoms $C_n$ in this carboxylic acid molecule is preferably in a range of 19 to 28, more preferably in a range of 19 to 24, and even more preferably in a range of 20 to 24. When the number of carbon atoms $C_n$ is equal to or greater than the lower limit value, the heat resistance of the ester wax α is generally improved. When the number of carbon atoms $C_n$ is equal to or less than the upper limit value, the low temperature fixability of the toner is generally improved.

The proportion of the carboxylic acids in the first monomer group having $C_n$ carbon atoms is preferably 70 to 95% by mass, more preferably 80 to 95% by mass, and even more preferably 85 to 95% by mass, with respect to 100% by mass of the first monomer group. When the proportion of the carboxylic acid molecules having $C_n$ carbon atoms is equal to or greater than the lower limit value, the maximum peak of the distribution of carbon atoms in the ester wax α tends to be on the side of the high number of carbon atoms. Therefore, the toner generally has excellent heat resistance and storage stability. When the proportion of the carboxylic acid having $C_n$ carbon atoms is equal to or less than the upper limit value, the ester wax α can generally be easily obtained.

The proportion of the carboxylic acid molecules in the first monomer group having 18 or fewer carbon atoms in the first monomer group is preferably 0 to 5% by mass, and more preferably 0 to 1% by mass, with respect to 100% by mass of the first monomer group. When the proportion of the carboxylic acid molecules having 18 or fewer carbon atoms is equal to or greater than the lower limit value, the ester wax α can be more easily obtained. When the proportion of the carboxylic acid molecules having 18 or fewer carbon atoms is equal to or less than the upper limit value, the proportion of the ester compound having a relatively low molecular weight in the resulting ester wax α is reduced. As a result, the toner generally has excellent heat resistance and storage stability.

The content of the carboxylic acid molecules having different number of carbon atoms within the first monomer group can be measured, for example, by mass spectrometry of the ester wax α on the product after the methanolysis reaction by field desorption mass spectrometry (FD-MS).

As the carboxylic acid in the first monomer group, a long-chain carboxylic acid is preferable, and a long-chain alkylcarboxylic acid is more preferable because the ester wax α can be more easily obtained. The long-chain carboxylic acid can be appropriately selected depending on the properties, performance, and the like required for the ester wax α.

As the long-chain carboxylic acid, a long-chain carboxylic acid having 19 to 28 carbon atoms is preferable, and a long-chain carboxylic acid having 20 to 24 carbon atoms is more preferable. When the number of carbon atoms in the long-chain carboxylic acid is equal to or greater than the lower limit value, the heat resistance of the ester wax α is generally improved. When the number of carbon atoms in the long-chain carboxylic acid is equal to or less than the upper limit value, the low-temperature fixability of the toner is generally improved.

Examples of a long-chain alkylcarboxylic acid include palmitic acid, stearic acid, arachidic acid, behenic acid, lignoceric acid, cerotic acid, and montanic acid.

Regarding the ester wax α, the second monomer group will be described.

From the viewpoint that the ester wax α can be more easily obtained, the number of different kinds of alcohol molecules in the second monomer group is preferably 5 or less, more preferably 4 or less, and even more preferably 3 or less.

Here, the number of carbon atoms of the alcohol molecule type having the maximum (highest) content level (by mass) in the second monomer group is defined as $C_m$. The number of carbon atoms $C_n$ is preferably in a range of 19 to 28, more preferably in a range of 20 to 24, and even more preferably in a range of 20 to 22. When the number of carbon atoms $C_n$ is equal to or greater than the lower limit value, the heat resistance of the ester wax α is generally improved. When the number of carbon atoms $C_n$ is equal to or less than the upper limit value, the low temperature fixability of the toner is generally improved.

The proportion of the alcohol molecules in the second monomer having $C_n$ carbon atoms is preferably 70 to 90% by mass, more preferably 80 to 90% by mass, and even more preferably 85 to 90% by mass, with respect to 100% by mass of the second monomer group. When the proportion of the alcohols having $C_n$ carbon atoms is equal to or greater than the lower limit value, the maximum peak of the distribution of carbon atoms in the ester wax α tends to be on the side of the high number of carbon atoms. Therefore, the toner generally has excellent heat resistance and storage stability. When the proportion of the alcohol having $C_n$ carbon atoms is equal to or less than the upper limit value, the ester wax α can be more easily obtained.

The proportion of the alcohol molecules having 18 or fewer carbon atoms in the second monomer group is preferably 20% by mass or less, more preferably 10 to 20% by mass, and even more preferably 15 to 20% by mass, with respect to 100% by mass of the second monomer group. When the proportion of the alcohol molecules having 18 or fewer carbon atoms is equal to or greater than the lower limit value, the ester wax α can be more easily obtained. When the proportion of the alcohol molecules having 18 or fewer carbon atoms is equal to or less than the upper limit value, the proportion of the ester compound having a relatively low molecular weight in the ester wax α is reduced. Therefore, the toner generally has excellent heat resistance and storage stability.

The content levels of the alcohol molecules having different number of carbon atoms in the second monomer group can be measured by mass spectrometry of the ester wax α on the product after the methanolysis reaction by FD-MS, for example.

As an alcohol in the second monomer group, a long-chain alcohol is preferable, and a long-chain alkyl alcohol is more preferable, because the ester wax α can be more easily obtained. The long-chain alcohol (s) can be appropriately selected according to the properties, performance and the like required for the ester wax α.

As a long-chain alcohol, a long-chain alcohol molecule having 19 to 28 carbon atoms is preferable, and a long-chain alcohol molecule having 20 to 22 carbon atoms is more preferable. When the number of carbon atoms in the long-chain alcohol molecule is equal to or greater than the lower limit value, the heat resistance of the ester wax α is generally improved. When the number of carbon atoms in the long-chain alcohol molecule is equal to or less than the upper limit value, the low temperature fixability of the toner is generally improved.

Examples of long-chain alkyl alcohols include palmityl alcohol, stearyl alcohol, arachidyl alcohol, behenyl alcohol, lignoceryl alcohol, ceryl alcohol, and montanyl alcohol.

In the ester wax α, it is preferable that the maximum (highest) content level ester compound in the ester wax α have $C_1$ carbon atoms. This number of carbon atoms $C_1$ is preferably 43 or more, more preferably in a range of 43 to 56, even more preferably in a range of 43 to 52, particularly preferably in a range of 44 to 46, and most preferably equal to 44. When the number of carbon atoms $C_1$ is equal to or greater than the lower limit value, the toner is generally excellent in heat resistance and storage stability. When the number of carbon atoms $C_1$ is equal to or less than the upper limit value, the ester wax α can be more easily obtained.

An ester compound having $C_1$ carbon atoms is represented by the following Formula (I):

$$R^1COOR^2$$

In Formula (I) $R^1$ and $R^2$ are alkyl groups. The combined total number of carbon atoms in $R^1$ and $R^2$ is preferably 42 or more, more preferably in a range of 42 to 55, even more preferably in a range of 42 to 51, particularly preferably in a range of 43 to 45, and most preferably equal to 43. When the total number of carbon atoms in $R^1$ and $R^2$ is equal to or greater than the lower limit value, the toner is generally excellent in heat resistance and storage stability. When the total number of carbon atoms in $R^1$ and $R^2$ is equal to or less than the upper limit value, the ester wax α can be more easily obtained. The number of carbon atoms in alkyl group $R^1$ can be controlled, for example, by adjusting the number of carbon atoms $C_n$ in the carboxylic acid of the first monomer group. The number of carbon atoms in alkyl group $R^2$ can be controlled, for example, by adjusting the number of carbon atoms $C_m$ in the alcohol molecule of the second monomer group.

The proportion of the ester compound having $C_1$ carbon atoms is preferably 65% by mass or more, more preferably 65% to 90% by mass, even more preferably 70% to 90% by mass, and particularly preferably 80% to 90% by mass, with respect to 100% by mass of the ester wax X. When the proportion of the ester compound having $C_1$ carbon atoms is equal to or greater than the lower limit value, the maximum peak of the distribution of carbon atoms in the ester wax α becomes sufficiently high for purposes of toner usage and the toner generally has excellent heat resistance and storage stability.

When the proportion of the ester compound having $C_1$ carbon atoms is equal to or less than the upper limit value, the ester wax α can be more easily obtained.

The distribution of carbon atoms in the ester wax α preferably has only one maximum distribution peak in the region having 43 or more carbon atoms. In this case, the proportion of the ester compound having a relatively low molecular weight will be low, and the toner has generally excellent heat resistance and storage stability.

In the distribution of carbon atoms in the ester wax α, the maximum distribution peak is preferably in the region of 43 to 56 carbon atoms, more preferably in the region of 44 to 52 carbon atoms, even more preferably in the region of 44 to 46 carbon atoms, and most preferably at 44 carbon atoms. When the maximum distribution peak is in the region of the number of carbon atoms equal to or greater than the lower limit value, the toner is generally excellent in heat resistance and storage stability. When the maximum distribution peak is in the region of the number of carbon atoms equal to or less than the upper limit value, the ester wax α can be more easily obtained.

The content levels of the ester compounds having different number of carbon atoms in the ester wax α can be measured, for example, with mass spectrometry by FD-MS.

The melting point of the ester wax α is preferably in a range of 60 to 85° C., more preferably in a range of 65 to 80° C., and even more preferably in a range of 65 to 75° C. When the melting point of the ester wax α is equal to or greater than the lower limit value, the toner is generally excellent in heat resistance and storage stability. In addition, toner offset (adhesion of toner to a hot-roll surface) is less likely to occur. When the melting point of the ester wax α is equal to or less than the upper limit value, the low temperature fixability of the toner is improved.

The melting point of the ester wax α can be measured, for example, as the maximum endothermic peak temperature by differential scanning calorimetry (DSC).

The ester wax α can be synthesized, for example, by reaction of a long-chain carboxylic acid and a long-chain alcohol in an esterification reaction. In the esterification reaction, it is preferable to use at least three different kinds of long-chain alkyl carboxylic acids and at least two different kinds of long-chain alkyl alcohols. The distribution of carbon atoms in the ester compound contained in the ester wax α can be adjusted by adjusting the number of carbon atoms in each of different kinds of the long-chain alkyl carboxylic acids and the long-chain alkyl alcohols and the relative amounts of each kind used.

The esterification reaction can be carried out, for example, while heating under a nitrogen stream. The esterification reaction product may be dissolved in a solvent containing ethanol, toluene, and/or the like, and further, a basic aqueous solution such as an aqueous sodium hydroxide solution may be added to separate the esterification reaction product into an organic layer and an aqueous layer for purification. By subsequently removing the aqueous layer, the ester wax α can be obtained. The purification operation is preferably repeated a plurality of times.

The colorant to be used in the toner is not particularly limited. For example, carbon black, cyan, yellow and magenta pigments, various dyes, and the like can be used.

Examples of carbon black in this context include aniline black, lamp black, acetylene black, furnace black, thermal black, channel black, and Ketjen black.

Certain examples of a pigment or dye include First Yellow G, Benzidine Yellow, Chrome Yellow, Quinoline Yellow, India Fast Orange, Irgazine Red, Carmin FB, Permanent Bordeaux FRR, Pigment Orange R, Resole Red 2G, Lake Red C, Rhodamine FB, Rhodamine B Lake, Dupont Oil Red, Phtalocyanin Blue, Pigment Blue, Aniline Blue, Calcoil Blue, Ultramarine Blue, Brilliant Green B, Phthalocyanine Green, Malachite Green Oxalate, Methylene Blue Chloride, Rose Bengal, Quinacridone, and the like.

The colorant can be represented by or with a color index ("C.I.") number. For example, the following are possible colorants for a toner: C. I. Pigment Black 1, 6, 7; C.I. Pigment Yellow 1, 12, 14, 17, 34, 74, 83, 97, 155, 180, 185; C. I. Pigment Orange 48, 49; C.I. Pigment Red 5, 12, 31, 48, 48: 1, 48: 2, 48: 3, 48: 4, 48: 5, 49, 53, 53: 1, 53: 2, 53: 3, 57, 57: 1, 81, 81: 4, 122, 146, 150, 177, 185, 202, 206, 207, 209, 238, 269; C. I. Pigment Blue 15, 15: 1, 15: 2, 15: 3, 15: 4, 15: 5, 15: 6, 75, 76, 79; C.I. Pigment Green 1, 7, 8, 36, 42, 58; C. I. Pigment Violet 1, 19, 42; C.I. Acid Red 52; and the like. However, the possible colorants are not limited to these examples.

Additionally, any one of the colorants may be used alone, or two or more thereof may be used in combination.

Examples of other possible components of the toner include additives such as charge control agents, surfactants, basic compounds, flocculants, pH adjusters, and antioxidants. However, the possible additives are not limited to these listed examples. Additionally, any one of these additives may be used alone, or two or more thereof may be used in combination.

When the toner mother particles contain a charge control agent, the toner can be more easily transferred onto a recording medium such as paper. Examples of the charge control agent include metal-containing azo compounds, metal-containing salicylic acid derivative compounds, metal oxide hydrophobized products, inclusion compounds of polysaccharide, and the like. As the metal-containing azo compound, a complex or complex salt in which the metal is iron, cobalt or chromium, or a mixture thereof is preferable. As the metal-containing salicylic acid derivative compound and the metal oxide hydrophobized product, a complex or complex salt in which the metal is zirconium, zinc, chromium or boron, or a mixture thereof is preferable. As the inclusion compound of polysaccharide, the inclusion compound of polysaccharide containing aluminum (Al) and magnesium (Mg) is preferable.

The volume average primary particle size of toner mother particles ($D_{50}$) is preferably 4 to 12 μm, and more preferably 5 to 10 μm. When the volume average primary particle size $D_{50}$ of the toner mother particles is equal to or higher than the lower limit value, it is easy to secure the surface area of the toner mother particles, and the external additive easily adheres to the toner mother particles. When the $D_{50}$ of the toner mother particles is equal to or less than the upper limit value, it is easy to suppress the adhesion of an excessive amount of the external additive to the toner mother particles. Therefore, it is easy to control the adhesive strength B, which will be described later, within a predetermined range.

The composition of the toner mother particles will be described. The content of the ester wax is preferably 3 to 15% by mass, more preferably 3 to 13% by mass, and even more preferably 5 to 10% by mass, with respect to 100% by mass of the toner mother particles. When the content of the ester wax is equal to or greater than the lower limit value, the toner is excellent in storage stability and heat resistance. Further, when the content of the ester wax is equal to or less than the upper limit value, the low temperature fixability of the toner is improved. In addition, the amount of charge is easily maintained sufficiently.

When the toner mother particles contain a crystalline polyester resin, the content of the crystalline polyester resin is preferably 5 to 25% by mass, more preferably 5 to 20% by mass, and even more preferably 5 to 15% by mass, with respect to 100% by mass of the toner mother particles. When the content of the crystalline polyester resin is equal to or greater than the lower limit value, the low temperature fixability of the toner is improved. Further, when the content of the crystalline polyester resin is equal to or less than the upper limit value, the toner is further excellent in low temperature offset resistance and high temperature offset resistance.

When the toner mother particles contain a non-crystalline polyester resin, the content of the non-crystalline polyester resin is preferably 60 to 90% by mass, more preferably 65 to 85% by mass, and even more preferably 70 to 80% by mass, with respect to 100% by mass of the toner mother particles. When the content of the non-crystalline polyester resin is equal to or greater than the lower limit value, the toner is further excellent in offset resistance. Further, when the content of the non-crystalline polyester resin is equal to or less than the upper limit value, the low temperature fixability of the toner is improved.

When the toner mother particles contain a colorant, the content of the colorant is preferably 2 to 13% by mass, and more preferably 3 to 8% by mass, with respect to 100% by mass of the toner mother particles. When the content of the colorant is equal to or greater than the lower limit value, the toner has excellent color reproducibility. Further, when the content of the colorant is equal to or less than the upper limit value, the dispersibility of the colorant is excellent and the low temperature fixability of the toner is improved. In addition, it is easy to control the charge amount of the toner.

The external additive contains a titanium oxide and a silica.

As a titanium oxide, strontium titanate and titanium dioxide ($TiO_2$) are preferable. When the external additive further contains either one or both of strontium titanate and titanium dioxide, the charge amount of the toner is less likely to be excessively high. In addition, the distribution of the charge amount of the toner tends to show a sharp shape. As a result, the amount of toner scattered is suppressed. In addition, the charge amount of the toner is maintained at an appropriate level even at a low temperature.

The $D_{50}$ of the titanium oxide is preferably 5 to 100 nm, more preferably 5 to 50 nm, and even more preferably 10 to 30 nm. When the $D_{50}$ of the titanium oxide is within the above numerical range, the adhesive strength (type A) tends to be high. In addition, the amount of toner scattered is likely to be suppressed. Therefore, dirt on the members inside the machine, image dirt, and fog are easily reduced.

Silica is a particle comprising silicon dioxide ($SiO_2$). The type of silica particle is not particularly limited as long as the adhesive strength (type B) is within a predetermined numerical range. For example, wet silica, calcined silica, and hydrophobic silica are mentioned, and various silicas can be used in addition to these examples.

Wet silica can be produced, for example, by a method (liquid phase method) in which sodium silicate made from silica sand is used as a raw material, an aqueous solution containing sodium silicate is neutralized to precipitate silica, and the silica is filtered and dried. Calcined silica (dry silica)

can be obtained by reacting silicon tetrachloride in a high-temperature flame or furnace.

The degree of hydrophobicity of hydrophobic silica can be measured by, for example, the following method: 50 ml of deionized water and 0.2 g of a sample is put in a beaker, and methanol is added dropwise from a burette while stirring the beaker solution with a magnetic stirrer. As the concentration of methanol in the beaker increases, the powder gradually settles, and the volume % of methanol in the mixed solution of methanol and deionized water at the end point where the entire amount settles is defined as the degree of hydrophobicity (%).

The $D_{50}$ of silica is preferably in a range of 70 to 120 nm, preferably in range of 75 to 115 nm, and more preferably in a range of 80 to 110 nm. When the $D_{50}$ of silica is equal to or greater than the lower limit value, the charge amount of the toner is likely to be maintained to be high. In addition, the adhesive strength (type B) tends to be high.

When the $D_{50}$ of silica is equal to or less than the upper limit value, the adhesive strength (type B) is less likely to become excessively high. In addition, the toner is less likely to be overcharged. Therefore, sufficient image density is more likely to be maintained.

The external additive may contain either primary particles of silica or secondary particles of silica. In this context, primary particles of silica refer to single particles made of silica. The primary particles of silica are preferably substantially spherical, more preferably true spherical.

In this context, secondary particles of silica refer to coalesced products in which two or more primary particles of silica are coalesced with each other. Therefore, the secondary particles will have an amorphous shape. The specific shape of such secondary particles is not particularly limited. The shape of the secondary particles may be a polygonal prism, a polyhedral shape, or an ellipsoidal shape.

The adhesive strength (type A) value is an index of the strength of adhesion of the external additive to the toner mother particles. The adhesive strength (type A) is calculated by the following Formula (1):

$$\text{Adhesive strength (type } A) = (I_{a2}/I_{a1}) \times 100$$

In Formula (1), $I_{a1}$ is an X-ray intensity of titanium measured for the unprocessed toner particles, and $I_{a2}$ is an X-ray intensity of titanium measured for the toner particles (group A) obtained by the following method.

Method A: an aqueous liquid containing toner and water is shaken for 5 minutes under conditions of 25° C. and 200 rpm, desorbed external additive is removed by centrifugation, and then particles (referred to as group A particles) are obtained by drying.

Regarding Method A, the aqueous liquid may further contain a surfactant. The surfactant is not particularly limited. Any of a cationic surfactant, an anionic surfactant, an amphoteric surfactant, and a nonionic surfactant can be used.

The adhesive strength (type A) of the toner of an embodiment is in a range of 90 to 100%, and preferably in a range of 93 to 100%. When the adhesive strength (type A) is equal to or greater than the lower limit value, the titanium oxide among the external additives is less likely to be desorbed from the surface of the toner mother particles. Therefore, when the toner is reused, unbound (free) titanium oxide is less likely to accumulate in the developer, deterioration of chargeability can be prevented, and image fog is less likely to occur.

Among the external additives, strontium titanate and titanium dioxide have relatively low chargeability. Therefore, these additives are less likely to be transferred to a recording medium such as paper and is less likely to develop. Therefore, in an image forming apparatus provided with a toner recycling system, the titanium oxides desorbed from the surface of the toner mother particles will usually be collected and returned to the developing device by a toner cleaning device. As such, the desorbed titanium oxides will be accumulated in the developer. When the titanium oxide, which has a relatively weak chargeability, accumulates in the developer, the chargeability of the developer deteriorates, and the toner with an insufficient charged amount gradually increases. As a result, image fog is likely to occur. However, this problem can be solved when the adhesive strength (type A) is 90% or more in the toner.

In investigating this problem, it has been unexpectedly found that a titanium oxide can be firmly adhered to the surface of the toner mother particles so as to meet the adhesive strength requirements by first adding the titanium oxide to the toner mother particles in the external addition step (before silica particle addition) and also adjusting the stirring speed, stirring time, external addition temperature, and the like during the toner production.

The adhesive strength (type B) is calculated by the following Formula (2):

$$\text{Adhesive strength (type } B) = (I_{b2}/I_{b1}) \times 100$$

The adhesive strength (type B) is an index of the strength of adhesion of the external additive to the toner mother particles.

In Formula (2), $I_{b1}$ is an X-ray intensity of silicon measured for the toner, and $I_{b2}$ is an X-ray intensity of silicon measured for particles (group B) obtained by the following method.

Method B: an aqueous liquid containing the toner and water is sonicated under conditions of 25° C., 28 kHz, 55 W, the desorbed external additive is removed by centrifugation, and then the particles obtained by drying are (referred to as group B particles) are collected.

The adhesive strength (type B) is 50 to 80%, preferably 55 to 75%, and more preferably 60 to 70%. When the adhesive strength (type B) is equal to or greater than the lower limit value, then silica in the external additives is less likely to be desorbed from the surface of the toner mother particles. Therefore, it is considered that the heat resistance and storage stability of the toner are likely improved.

When the adhesive strength (type B) is equal to or less than the upper limit value, it is possible to secure the required fluidity of the toner. Therefore, the triboelectric charging with a carrier is less likely to be hindered in the developer.

In an image forming apparatus provided with a toner recycling system, silica may be desorbed from the surface of the toner mother particles over time and with repeated use. In particular, silica is likely to be desorbed under long term usage conditions in which there have been many cycles of temperature rises and applications of mechanical stress. When silica is easily desorbed from the surface of the toner mother particles in the developer, the developer experiences caking, and image defects such as white streaks due to poor toner transfer are more likely to occur. On the other hand, if the adhesive strength of silica is too high, the fluidity of the toner will generally be lowered, and there is a problem that image fog is more likely to occur. This is because the toner is required to have an appropriate fluidity from the viewpoint of chargeability by contact with the carrier.

In investigating this problem, it has been unexpectedly found that the titanium oxide can be more firmly adhered to the surface of the toner mother particles by adding titanium oxide to the toner mother particles before adding silica during toner production and by adjusting the stirring speed, stirring time, external addition temperature, and the like during the external addition step. Specifically, the above-mentioned fogging problem can be solved by setting the adhesive strength (type B) to 50 to 80%.

The effect of having the adhesive strength (type A) and the adhesive strength (type B) within a predetermined range becomes even more remarkable when at least a part of the binder resin is a crystalline polyester resin.

When the toner mother particles contain a crystalline polyester resin, the toner has excellent low-temperature fixability. However, the following problems may occur in a toner containing a crystalline polyester resin:

The toner containing a crystalline polyester resin having low heat resistance tends to soft-cake or clump together at a high temperature. Since soft-caked or clumped toner has low fluidity, poor transfer of the developer is more likely to occur in the image forming apparatus.

The toner containing a crystalline polyester resin has high hygroscopicity this tends reduce an amount of charge.

Thus, it is difficult to maintain low temperature fixability, fluidity, and the amount of charge in a toner containing crystalline polyester. On the other hand, using an external additive is often effective in improving the heat resistance of the toner and maintaining the amount of charge. However, when the toner is being reused over and over, the external additive tends to be desorbed from the toner and thus performance of the reused toner supplied back to the developing device may degrade over time (with reuse). Therefore, it becomes more difficult to maintain heat resistance and the amount of charge in an appropriate range for such toner.

For these problems, the toner of the embodiment has adhesive strength (type A) and adhesive strength (type B) within predetermined ranges. Therefore, the heat resistance and fluidity of the toner can be appropriately maintained, and poor transfer of the developer is less likely to occur. In particular, since the adhesive strength (type B) is 50 to 80%, silica adheres to the toner mother particles with an appropriate strength. Therefore, the amount of charge is less likely to decrease with reuse or otherwise.

The external additive may further include an inorganic oxide other than silica, strontium titanate, or titanium dioxide as long as the effects disclosed in the embodiment can still be obtained. Examples of other inorganic oxides include alumina, tin oxide and the like.

The particles composed of silica particles and inorganic oxides may be surface-treated with a hydrophobizing agent from the viewpoint of improving stability. Any one of the inorganic oxides may be used alone, or two or more thereof may be used in combination.

The content of the external additive is preferably 2 to 15 pts. mass, more preferably 4 to 10 pts. mass, and even more preferably 4 to 8 pts. mass with respect to 100 pts. mass of the toner mother particles. When the content of the external additive is within the above numerical range, it is easier to control the adhesive strength (type A) and the adhesive strength (type B) to be within a specific range. Further, when the content of the external additive is equal to or greater than the lower limit value, it is easier to secure the required charge amount of the toner. Therefore, it is generally easier to maintain the amount of charge even under high temperature and high humidity conditions, and image defects are less likely to occur. When the content of the external additive is equal to or less than the upper limit value, the charge amount of the toner is less likely to become excessively high. Therefore, the charge amount of the toner can be maintained at an appropriate level.

A method for manufacturing toner will be described.

The toner of an embodiment can be produced by mixing toner mother particles and an external additive. By mixing the toner mother particles and the external additive, the external additive adheres to the surface of the toner mother particles.

The toner mother particles of the embodiment can be produced by, for example, a kneading and pulverizing method or a chemical method.

Examples of the kneading and pulverizing method include a manufacturing method including the following mixing step, kneading step and pulverizing step. The kneading and pulverizing method may further include the following classification step, if necessary.

Mixing step: a step of mixing at least a binder resin, an ester wax, and a colorant to obtain a mixture.

Kneading step: a step of melt-kneading the mixture to obtain a kneaded product.

Pulverizing step: a step of pulverizing the kneaded product to obtain a pulverized product.

Classification step: a step of classifying the pulverized product.

In the mixing step, the raw materials of toner are mixed to obtain a mixture. A mixer may be used in the mixing step. The mixer is not particularly limited. In the mixing step, other binder resins and other components may be used as needed.

In the kneading step, the mixture obtained in the mixing step is melt-kneaded to obtain a kneaded product. A kneading machine may be used for the kneading step. The kneading machine is not particularly limited.

In the pulverizing step, the kneaded product obtained in the kneading step is pulverized to obtain a pulverized product. A pulverizer may be used in the pulverizing step. As the pulverizer, various pulverizers such as a hammer mill can be used. Further, the pulverized product obtained by the pulverizer may be further pulverized. As a pulverizer for further pulverizing the pulverized product, various pulverizers can be used. The pulverized product obtained in the pulverizing step may be used as it is as toner mother particles, or may be used as toner mother particles through the classification step if necessary.

In the classification step, the pulverized product obtained in the pulverizing step is classified. A classifier may be used in the classification step. The classifier is not particularly limited.

In the chemical method, a binder resin, an ester wax, another binder resin if necessary, and other components are mixed to obtain a mixture. Next, the mixture is melt-kneaded to obtain a kneaded product. Next, the kneaded product is pulverized to obtain coarsely granulated medium-pulverized particles. Next, the medium-pulverized particles are mixed with an aqueous medium to prepare a mixed solution. Next, the mixed solution is subjected to mechanical shearing to obtain a fine particle dispersion liquid. Finally, the fine particles are aggregated in the fine particle dispersion liquid to form toner mother particles.

The method of adding an external additive will be described (external addition step).

The external additive is stirred with the toner mother particles by, for example, a mixer. The mixer preferably has a temperature control function. The temperature at which the external additive adheres to the toner mother particles is not particularly limited, but is preferably 20 to 35° C., for example. The higher the temperature at which the external additive adheres to the toner mother particles, the easier it is for the titanium oxide to adhere to the toner mother particles. Therefore, the adhesive strength (type A) tends to be high.

The stirring speed at which the external additive adheres to the toner mother particles is not particularly limited, but is preferably 800 to 1200 rpm, for example. The higher the stirring speed at which the external additive adheres to the toner mother particles, the easier it is for silica to adhere to the toner mother particles. Therefore, the adhesive strength (type B) tends to be high.

When making the external additive adhere to the toner mother particles, it is preferable to stir the titanium oxide and the toner mother particles, and then add silica and stir from the viewpoint of making the titanium oxide strongly adhere to the toner mother particles.

When silica is added after stirring the titanium oxide and the toner mother particles, the proportion of the stirring time of silica to the total stirring time is preferably about 50 to 80%. When the proportion is equal to or greater than the lower limit value, it is easy to secure the stirring time of silica, and the adhesive strength (type B) tends to be high.

When the proportion is equal to or less than the upper limit value, it is easy to secure the stirring time of the titanium oxide, and the adhesive strength A tends to be high.

The external additive before being stirred may be sieved with a sieve or sieving apparatus (siever), if necessary. The siever type and method is not particularly limited. Various sievers can be used.

The toner cartridge of an embodiment contains a toner of the above-described embodiment. For example, the toner cartridge includes a container, and a toner of the embodiment is stored in the container. The container dimensions, sizes, and shapes are not particularly limited, and various containers that may be used by an image forming apparatus can be used.

The toner may be used as a two-component developer in combination with a carrier.

Hereinafter, an image forming apparatus of an embodiment will be described with reference to drawings.

FIG. 1 is a view illustrating an example of a schematic structure of an image forming apparatus capable of reusing the collected toner.

A copier main body 101 illustrated in FIG. 1 includes an image forming unit 101A, a document mounting table 135, a scanner 136 below the document mounting table 135, and paper feed cassettes 142 and 143.

The image forming unit 101A includes a photoconductive drum 102 that can rotate in the direction of the depicted arrow, an electrostatic charger 103 that charges the surface of the photoconductive drum 102, a laser unit 104 that forms an electrostatic latent image on the surface of the photoconductive drum 102, a developing device 105 that develops the electrostatic latent image on the photoconductive drum 102 with toner, a transfer charger 106 that functions to transfer the toner image formed on the photoconductive drum 102 to paper or the like, a cleaning device 107 that removes residual toner left on the photoconductive drum 102 after image transfer, and a replenishment container 108 including the developing device 105.

The electrostatic charger 103, the laser unit 104, the developing device 105, the transfer charger 106, and the cleaning device 107 in this order along the rotation direction of the photoconductive drum 102.

The replenishment container 108 replenishes the developing device 105 with toner. The toner is stored in the replenishment container 108.

The scanner 136 scans a document on the document mounting table 135. The scanner 136 includes a light source 137 that irradiates the document with light, a first reflection mirror 138 that reflects the light reflected back from the document in a predetermined direction, a second reflection mirror 139 and a third reflection mirror 140 that sequentially reflect the light reflected from the first reflection mirror 138, and a light receiving element 141 that receives the light reflected from the third reflection mirror 140.

The paper feed cassettes 142 and 143 feed paper to the image forming unit 101A. The paper is conveyed upward via a conveyance system 144. The conveyance system 144 includes a transport roller pair 145, a registration roller pair 146, the transfer charger 106, a fixing roller pair 147, and a paper discharge roller pair 148.

In the image forming apparatus illustrated in FIG. 1, image formation is performed as follows.

First, the document on the document mounting table 135 is irradiated with light from the light source 137. The irradiated light is reflected from the document, then is received by the light receiving element 141 via the first reflection mirror 138, the second reflection mirror 139, and the third reflection mirror 140, and a document image is read from the document. Next, the surface of the photoconductive drum 102 is irradiated with laser beam LB from the laser unit 104 based on the document image.

The surface of the photoconductive drum 102 is negatively charged by the electrostatic charger 103. When the laser beam LB is irradiated from the laser unit 104, the photoconductive drum 102 is selectively exposed, and the charged potential of the irradiated portion approaches zero as electrostatic charge flows away from the exposed (now-conductive regions) of the photoconductive drum 102. Therefore, in the region corresponding to the image portion of the document, the surface potential of the photoconductive drum 102 approaches zero according to the density of the image, and an electrostatic latent image is formed.

The electrostatic latent image becomes a toner image by adsorbing toner at a position facing the developing device 105 by the rotation of the photoconductive drum 102. After a toner image is formed, the paper is supplied from the paper feed cassettes 142 and 143 to the conveyance system 144. The paper is aligned by the registration roller pair 146 and then fed between the transfer charger 106 and the photoconductive drum 102. Then, the toner image on the photoconductive drum 102 is transferred to the paper.

The paper with the toner image is conveyed to the fixing roller pair 147. At the fixing roller pair 147, the paper is pressed and heated to fix the toner image to the paper. The toner of the present embodiment has an excellent, low temperature fixability (that is, it is not required to heat the fixing roller pair 147 to a very high temperature) since the toner mother particles contain a crystalline polyester resin. Therefore, toner fixing at about 140 to 170° C. is possible. After fixing, the paper is discharged onto a paper discharge tray 150 via the paper discharge roller pair 148.

The toner remaining on the surface of the photoconductive drum 102 without being transferred to the paper is removed by the cleaning device 107. This removed toner is returned to the developing device 105 by a collection mechanism. 110 and later will be reused for a subsequent printing. In the image forming apparatus illustrated in FIG. 1, when the toner in the developing device 105 has been consumed, the toner of an embodiment can be added as fresh toner from the replenishment container 108.

Figure 2:
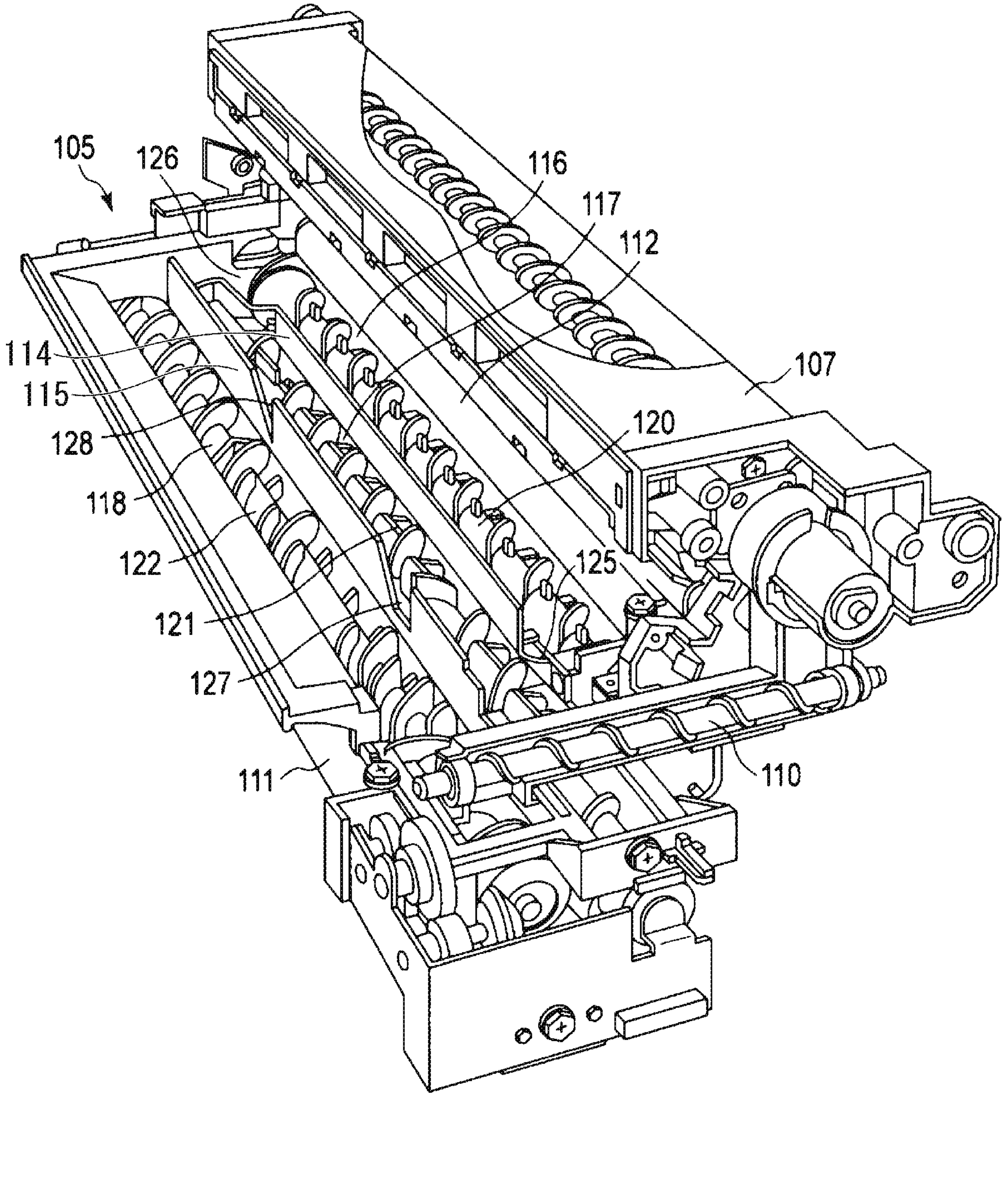
FIG. 2 is a perspective view of a developing device.
Figure 3:
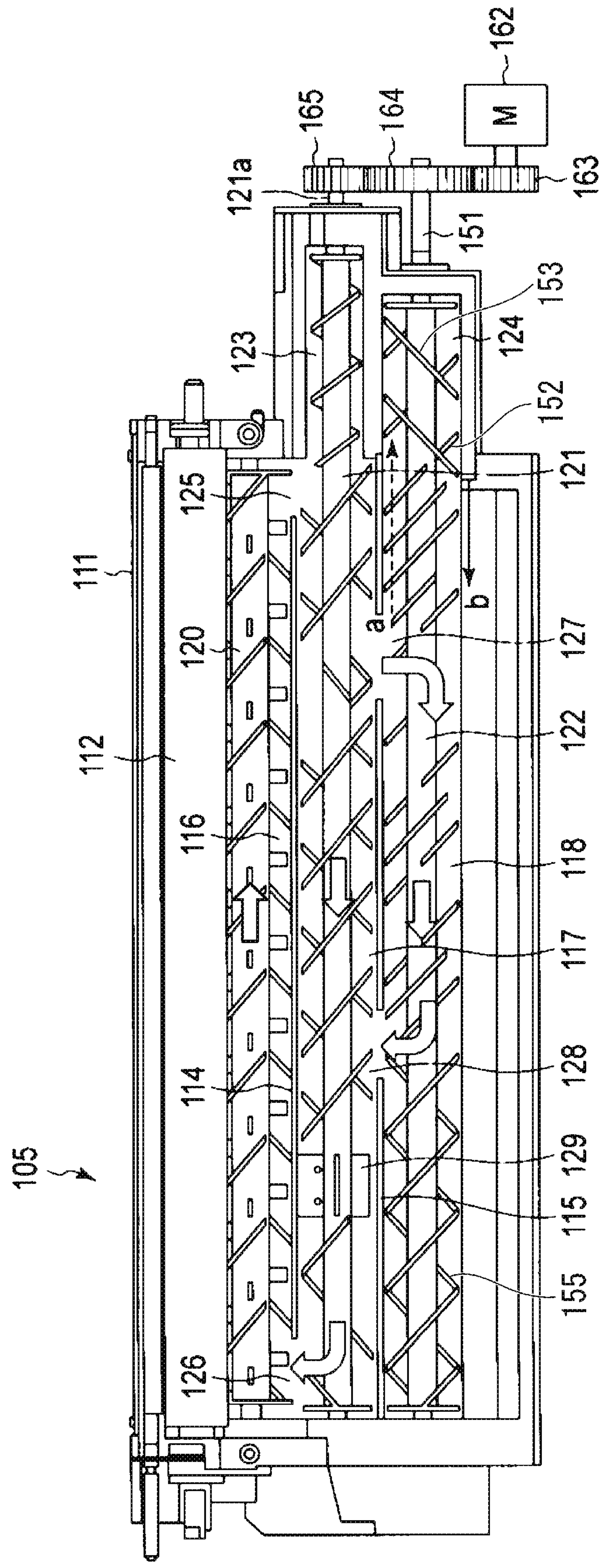
FIG. 3 is a side view of a developing device.

The developing device 105 will be described with reference to FIGS. 2 and 3.

The developing device 105 includes the collection mechanism 110 for collecting toner for reuse (also referred to in some instances as toner recycling), a developer container 111 containing the developer including the toner of the embodiment, a developing roller 112 rotatably provided in the developer container 111, a first partition wall 114 and a second partition wall 115 forming a first chamber 116, a second chamber 117, and a third chamber 118 in the developer container 111, a first mixer 120 provided in the first chamber 116, a second mixer 121 provided in the second chamber 117, a third mixer 122 provided in the third chamber 118, a fresh toner receiver 123 that receives the fresh toner supplied from the replenishment container, a recycled toner receiver 124, and a toner concentration detector 129.

The developing device 105 is connected to the cleaning device 107 via the collection mechanism 110. In the developing device 105, the collection mechanism 110 is an auger to which the reused toner is conveyed. However, the collection mechanism 110 is not limited to an auger.

The cleaning device 107 may be a cleaning blade or a cleaning brush.

The developing roller 112 is disposed at a position facing the lower surface of the photoconductive drum. The developing roller 112 rotates to supply the developer to the photoconductive drum.

A first communication portion 125 is formed on the first end side of the first partition wall 114. A second communication portion 126 is formed on the second end side of the first partition wall 114. A third communication portion 127 and a fourth communication portion 128 are each formed on the second partition wall 115.

The inside of the developer container 111 is divided into the first chamber 116, the second chamber 117, and the third chamber 118 by the first partition wall 114 and the second partition wall 115. The first chamber 116, the second chamber 117, and the third chamber 118 are formed substantially parallel to the axial direction of the photoconductive drum 102.

The direction from the second communication portion 126 to the first communication portion 125 on the first partition wall 114 is defined as a first direction. The direction opposite to the first direction, that is, the direction from the first communication portion 125 to the second communication portion 126 is defined as a second direction.

When the first mixer 120 rotates, the developer is stirred and conveyed in the first direction and supplied to the developing roller 112. The second mixer 121 and the third mixer 122 stir and convey the developer in the second direction and feed the developer to the upstream side of the first mixer 120.

The second mixer 121 and the third mixer 122 are rotationally driven by drive means such as motors, shafts, gears, and/or the like. In the developing device 105, a drive motor 162 is provided as a single drive source and a drive gear 163 is rotated by the drive motor 162. A rotating shaft 151 of the third mixer 122 is connected to the drive gear 163 via a large-diameter power transmission gear 164. A rotating shaft 121*a* of the second mixer 121 is connected to the large-diameter power transmission gear 164 via a small-diameter power transmission gear 165.

In the developing device 105, the conveyance speed of the developer by the third mixer 122 is less than the conveyance speed of the developer by the second mixer 121. Therefore, the conveyance time of the developer by the third mixer 122 is longer than the conveyance time of the developer by the second mixer 121.

In other embodiments, the second and third mixers 121 and 122 may be individually rotationally driven by different drive motors having different rotational speeds. The third mixer 122 may be provided with a reverse feed blade that conveys the collected toner in the direction opposite to the second direction. Regardless of which driving method is adopted, the conveyance speed of the collected toner by the third mixer 122 can be made less than the conveyance speed of the developer of the second mixer 121.

Next, the developing operation of the developing device 105 will be described with reference to FIGS. 2 and 3.

In the developer container 111, the developer is stirred and conveyed in the first direction by the rotation of the first mixer 120, and is thus supplied to the developing roller 112. Then, the developer is supplied to the electrostatic latent image formed on the photoconductive drum 102 by the rotation of the developing roller 112, and the electrostatic latent image is developed with toner particles.

The developer carried out from the first mixer 120 is guided into the second chamber 117 via the first communication portion 125. Then, in the second chamber 117, the developer is conveyed in the arrow direction (second direction) by the rotation of the second mixer 121. The developer carried out by the second mixer 121 is sent out to the upstream side of the first mixer 120 via the second communication portion 126, and is conveyed so as to circulate to and from the first mixer 120.

A part of the developer conveyed by the second mixer 121 is sent from the third communication portion 127 into the third chamber 118 and conveyed in the arrow direction (second direction). The developer is sent into the second chamber 117 again from the fourth communication portion 128, and is stirred and conveyed by the second mixer 121. Then, the developer is sent to the upstream side of the first mixer 120 via the second communication portion 126.

Here, the toner concentration in the developer which is stirred and conveyed by the second mixer 121 is detected by the toner concentration detector 129. When the toner concentration detected by the toner concentration detector 129 becomes equal to or less than a predetermined value, toner is replenished from the replenishment container 108. This replenishing toner falls on the fresh toner receiver 123 of the developer container 111. The fresh toner is stirred and conveyed in the direction of the arrow (second direction) by the rotation of the second mixer 121, and is sent to the upstream side of the first mixer 120.

The collected toner collected from the cleaning device 107 by the collection mechanism 110 falls on the recycled toner receiver 124. The collected toner is conveyed in the second direction by the rotation of the third mixer 122. Here, the developer guided from the third communication portion 127 into the third chamber 118 is stirred and conveyed toward the recycled toner receiver 124 side (as illustrated by an arrow a) by the rotation of a reverse feed blade 153 of the third mixer 122. Then, the developer is stirred and conveyed in the second direction together with the collected toner by the rotation of a forward feed blade 152 (as illustrated by an arrow b). The collected toner is sent to the upstream side of the first mixer 120 via the fourth communication portion 128 and the second communication portion 126 in this order.

Some portion of the developer and the collected toner is not sent directly into the second chamber 117 via the fourth communication portion 128, but rather is sent to the downstream side in the conveyance direction. Such portion of the developer and the collected toner is reversely fed by the rotation of a reverse feed blade 155, returned to the fourth communication portion 128, and then sent to the second chamber 117 via the fourth communication portion 128.

Figure 4:
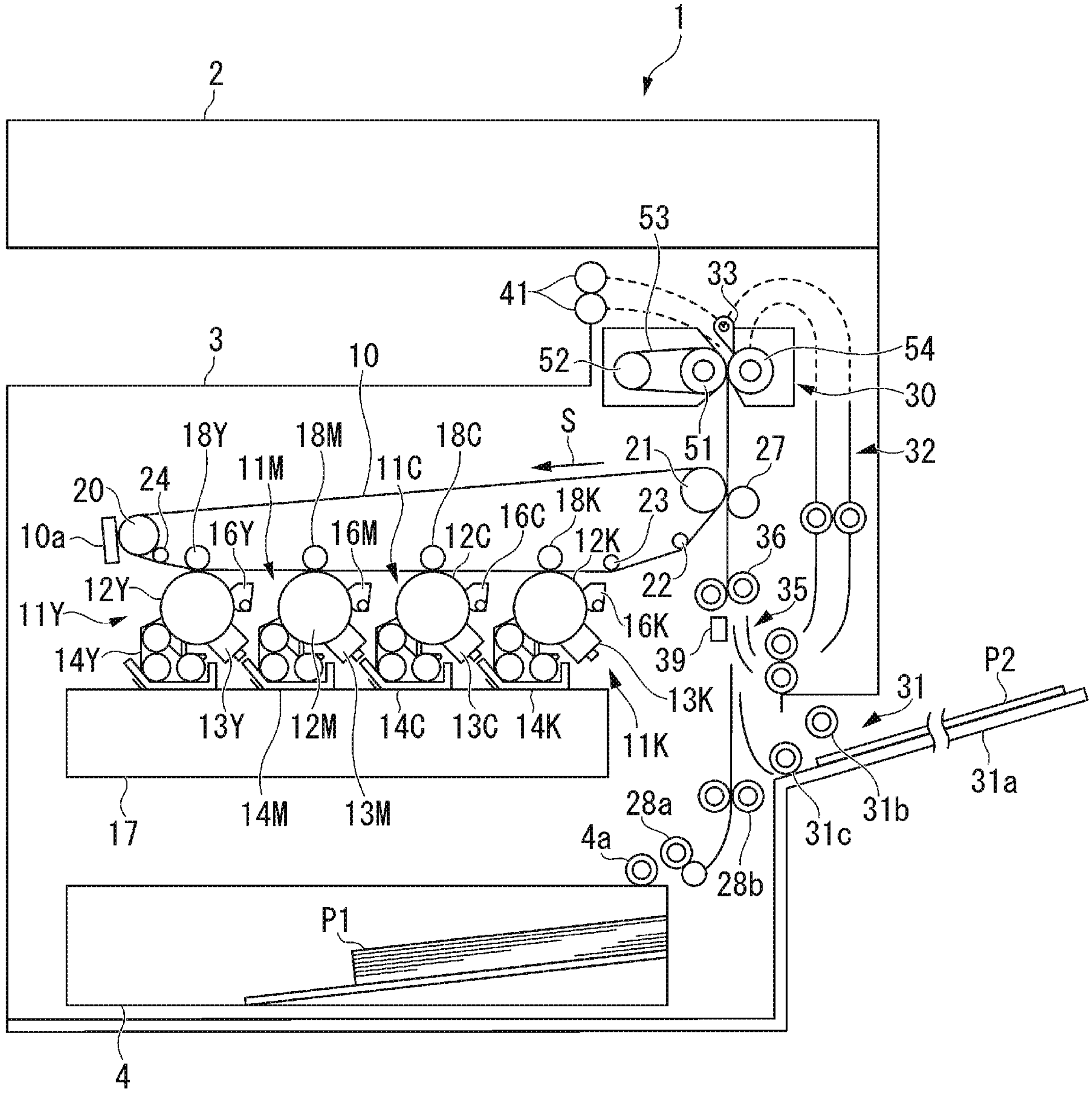
FIG. 4 depicts a schematic structure of an image forming apparatus of another embodiment.

FIG. 4 illustrates an example of an image forming apparatus in which a developer containing the toner of an embodiment is used.

The image forming apparatus illustrated in FIG. 4 has a form in which a toner image is fixed. However, the image forming apparatus of an embodiment is not limited to this. The image forming apparatus according to other embodiments may incorporate an ink jet type image forming method.

The image forming apparatus 1 illustrated in FIG. 4 is a 4-unit tandem-type color copier (referred to as a multifunctional peripheral (MFP) device. The image forming apparatus 1 includes a scanner unit 2, a paper discharge unit 3, a paper feed cassette 4, an intermediate transfer belt 10, four image forming stations 11Y, 11M, 11C, and 11K disposed along a traveling direction S of the intermediate transfer belt 10, a secondary transfer roller 27, a fixing device 30, and a manual feed mechanism 31.

The intermediate transfer belt 10 is wound around and supported by a driven roller 20 and a backup roller 21. Tension is applied to the intermediate transfer belt 10 by a first tension roller 22, a second tension roller 23, and a third tension roller 24 in addition to the driven roller 20 and the backup roller 21.

The image forming station 11Y, 11M, 11C, and 11K include photoconductive drums 12Y, 12M, 12C, and 12K in contact with the intermediate transfer belt 10, respectively.

Around the photoconductive drums 12Y, 12M, 12C, and 12K, electrostatic chargers 13Y, 13M, 13C, and 13K, developing devices 14Y, 14M, 14C, and 14K, photoconductive cleaning devices 16Y, 16M, 16C, and 16K, and primary transfer rollers 18Y, 18M, 18C, and 18K are disposed.

The electrostatic chargers 13Y, 13M, 13C, and 13K negatively charge the surfaces of the photoconductive drums 12Y, 12M, 12C, and 12K. Between the electrostatic chargers 13Y, 13M, 13C, and 13K and the developing devices 14Y, 14M, 14C, and 14K, a laser exposure device 17 irradiates the photoconductive drums 12Y, 12M, 12C, and 12K with exposure light. Then, an electrostatic latent image is formed on the photoconductive drums 12Y, 12M, 12C, and 12K.

The developing devices 14Y, 14M, 14C, and 14K include a two-component developer composed of yellow (Y), magenta (M), cyan (C), and black (K) toners and carriers, respectively. The developing devices 14Y, 14M, 14C, and 14K supply toner to the electrostatic latent images on the photoconductive drums 12Y, 12M, 12C, and 12K, respectively. In this way, the image forming stations 11Y, 11M, 11C, and 11K form monochromatic images of yellow (Y), magenta (M), cyan (C), and black (K), respectively.

The primary transfer rollers 18Y, 18M, 18C, and 18K are provided on the intermediate transfer belt 10 at positions facing the photoconductive drums 12Y, 12M, 12C, and 12K, respectively. The primary transfer rollers 18Y, 18M, 18C, and 18K are for primary transfer of the toner image on the photoconductive drums 12Y, 12M, 12C, and 12K to the intermediate transfer belt 10.

The primary transfer rollers 18Y, 18M, 18C, and 18K are each a conductive roller. A primary transfer bias voltage is applied to each of the primary transfer rollers 18Y, 18M, 18C, and 18K.

The secondary transfer roller 27 is disposed at a transfer position where the intermediate transfer belt 10 is supported by the backup roller 21. The backup roller 21 is a conductive roller. A predetermined secondary transfer bias is applied to the backup roller 21.

When a sheet of paper to be printed passes between the intermediate transfer belt 10 and the secondary transfer roller 27, the toner image on the intermediate transfer belt 10 is secondarily transferred onto the sheet of paper. After the completion of the secondary transfer, the intermediate transfer belt 10 is cleaned by a belt cleaner 10*a*.

The paper feed cassette 4 is provided below the laser exposure device 17. The paper feed cassette 4 supplies a sheet of paper P1 toward the secondary transfer roller 27. A pickup roller 4*a*, a separation roller 28*a*, a conveyance roller 28*b*, and a registration roller pair 36 are provided between the paper feed cassette 4 and the secondary transfer roller 27.

The manual feed mechanism 31 is provided on one side of the image forming apparatus 1. The manual feed mechanism 31 is for feeding a sheet of paper P2 by manual feed. In the manual feed mechanism 31, a manual feed pickup roller 31*b* and a manual feed separation roller 31*c* are provided between a manual feed tray 31*a* and the registration roller pair 36.

A media sensor 39 for detecting the sheet type is disposed on a vertical conveyance path 35 along which the sheet of paper is conveyed from the paper feed cassette 4 or the manual feed tray 31*a*. The image forming apparatus 1 can control the conveyance speed, transfer conditions, fixing conditions of the sheet of paper from the detection results of the media sensor 39. The sheet of paper is conveyed to the fixing device 30 along the vertical transfer path 35 via the registration roller pair 36 and the secondary transfer roller 27.

The fixing device 30 includes a fixing belt 53 wound around a pair of heating roller 51 and drive roller 52, and an opposing roller 54 disposed to face the heating roller 51 via the fixing belt 53. The fixing device 30 can heat the fixing belt 53 at the portion in contact with the heating roller 51. Then, the fixing device 30 heats and presses the sheet of paper between the fixing belt 53 and the opposing roller 54 to fix the toner image on the sheet of paper.

The toner of an embodiment has excellent low temperature fixability since the toner mother particles comprise a crystalline polyester resin. Therefore, for example, fixing at about 140 to 170° C. is possible.

A gate 33 is provided downstream of the fixing device 30. The sheet of paper is distributed in the direction of a paper discharge roller 41 or the direction of a re-conveyance unit 32. The sheet of paper distributed to the paper discharge roller 41 is discharged to the paper discharge unit 3. On the other hand, the sheet of paper distributed to the re-conveyance unit 32 is guided toward the secondary transfer roller 27 again.

In the image forming apparatus 1 illustrated in FIG. 4, the image forming station 11Y includes the photoconductive drum 12Y and a process member integrally, and is detachably attached to the image forming apparatus main body. Examples of the process member include the electrostatic charger 13Y, the developing device 14Y, and the photoconductor cleaning device 16Y. However, in other embodiments, the image forming stations 11Y, 11M, 11C, and 11K each may be detachably attached to the image forming apparatus 1, and may be detachable from the image forming apparatus 1 as an integrated image forming unit 11.

The toner of an embodiment may be applied to an image forming apparatus 1 in which the developing device 14Y of the image forming apparatus illustrated in FIG. 4 is modified.

Figure 5:
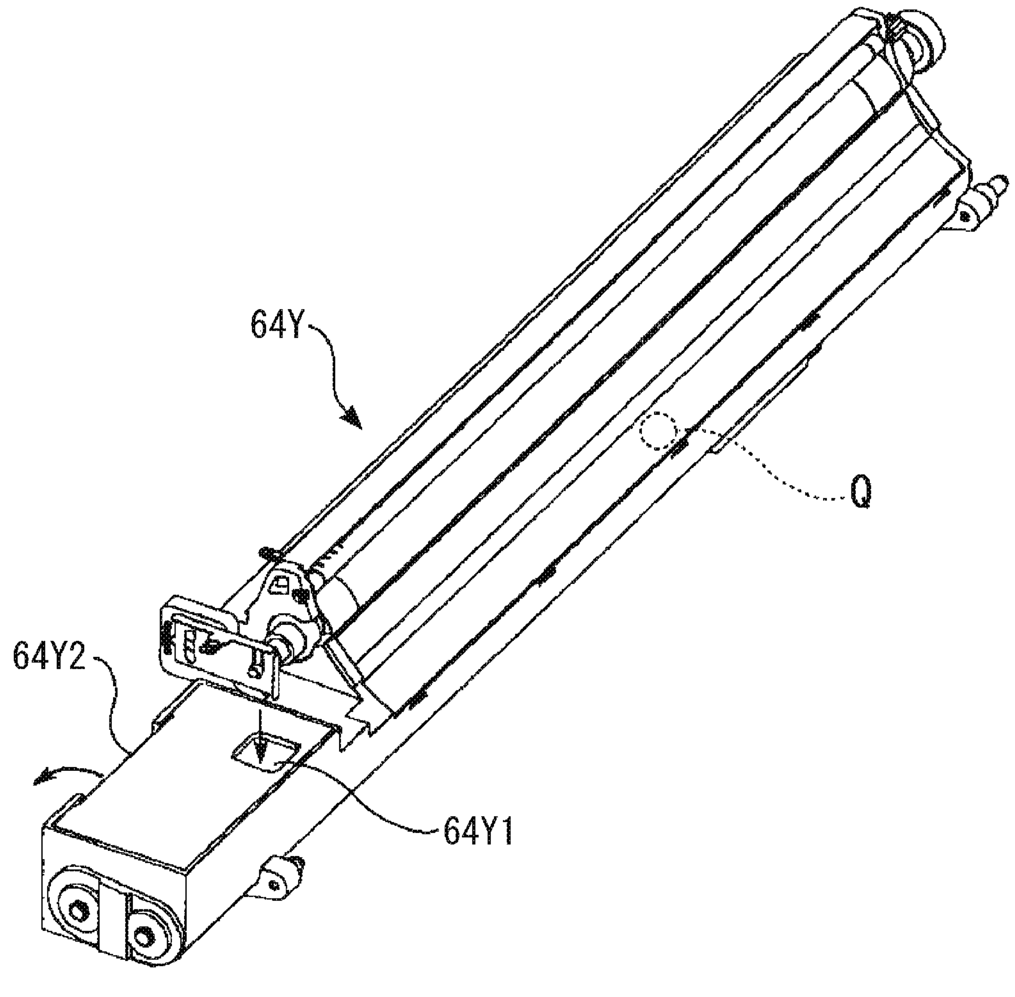
FIG. 5 is a perspective view of a modification example of a developing device.

FIG. 5 illustrates an example of a modification example of the developing device applicable to the image forming apparatus 1 of FIG. 4.

A developing device 64Y illustrated in FIG. 5 contains a two-component developer composed of yellow toner and a carrier. The developing device 64Y includes a toner concentration sensor Q. The toner concentration sensor Q detects a decrease in toner concentration. When a decrease in concentration is detected, the developing device 64Y replenishes the yellow toner from a toner cartridge. In this way, the developing device 64Y can constantly maintain an appropriate toner concentration.

In addition, the developing device 64Y can replenish the carrier from the toner cartridge via a developer replenishing port 64Y1. Then, the developing device 64Y can discharge developer from a developer discharge port 64Y2 by overflow matching the amount of the replenished carrier.

In this way, in the developing device 64Y, the amount of the developer is kept constantly, and the old and deteriorated carriers can be gradually replaced with new carriers.

Similar to the developing device 14Y, the developing devices 14M, 14C, and 14K in FIG. 4 may be also modified into developing devices similar to the developing device 64Y, except that a magenta toner, a cyan toner, and a black toner are used instead of yellow toner.

The toner of at least one embodiment described above is less likely to cause image defects even when the toner is being reused/recycled.

EXAMPLES

Hereinafter, certain examples will be illustrated, and particular embodiments will be described.

The preparation of an ester wax A used in these examples will be described.

Eighty (80) pts. mass (parts by total mass) of at least 3 kinds of long-chain alkyl carboxylic acid and twenty (20) pts. mass (parts by total mass) of at least 2 kinds of long-chain alkyl alcohol were put into a four-necked flask equipped with a stirrer, a thermocouple, and a nitrogen introduction tube. An esterification reaction was carried out at 220° C. under a nitrogen stream to obtain a reaction product. The obtained reaction product was dissolved by adding a mixed solvent of toluene and ethanol. Next, an aqueous sodium hydroxide solution was added to the flask, and the mixture was stirred at 70° C. for 30 minutes. The flask was allowed to stand for 30 minutes after stirring, by which time the contents of the flask had separated into an organic layer and an aqueous layer. The aqueous layer was then removed from the flask. Then, deionized water was added to the flask, and the mixture was stirred at 70° C. for 30 minutes. The flask was then allowed to stand for 30 minutes, by which time the contents in the flask had separated into an aqueous layer and an organic layer. The aqueous layer was then removed from the flask. This cycle of addition of water, stirring, standing, and separation/removal of the aqueous layer was repeated 5 times. The solvent was then distilled off from the organic layer in the flask under reduced pressure conditions to obtain the ester wax A.

The long-chain alkylcarboxylic acids used is as follows:

Palmitic acid ($C_{16}H_{32}O_2$)
Stearic acid ($C_{18}H_{36}O_2$)
Arachidic acid ($C_{20}H_{40}O_2$)
Behenic acid ($C_{22}H_{44}O_2$)
Lignoceric acid ($C_{24}H_{48}O_2$)
Cerotic acid ($C_{26}H_{52}O_2$)
Montanic acid ($C_{28}H_{56}O_2$)

The long-chain alkyl alcohols used is as follows:

Palmicyl alcohol ($C_{16}H_{34}O$)
Stearyl alcohol ($C_{18}H_{38}O$)
Arachidyl alcohol ($C_{20}H_{42}O$)
Behenyl alcohol ($C_{22}H_{48}O$)
Lignoceryl alcohol ($C_{24}H_{50}O$)
Ceryl alcohol ($C_{26}H_{54}O$)
Montanyl alcohol ($C_{28}H_{58}O$)

A method for measuring the distribution of carbon atoms (proportion of ester compounds having different number of carbon atoms) in the ester compounds constituting the ester wax will be described.

First, 0.5 g of the toner of each example was weighed and placed in a separate Erlenmeyer flask. Next, 2 mL of methylene chloride was added to each Erlenmeyer flask to dissolve the toner. Next, 4 ml of hexane was added to each Erlenmeyer flask to prepare a mixed solution. The mixed solution was then filtered and separated into a filtrate and an insoluble matter. The solvent was distilled off from the filtrate under a nitrogen stream to obtain a precipitate. From this precipitate, the distribution ester compounds (by carbon atom number) in the ester wax extracted from the toner was measured.

The proportion of the ester compound having each number of carbon atoms was measured by FD-MS "JMS-T100GC (made by JEOL Ltd.)". The measurement conditions were as follows:

Sample concentration: 1 mg/ml (solvent, chloroform)
Cathode voltage: −10 kV.
Spectrum recording interval: 0.4 s.
Measurement mass range (m/z): 10 to 2000.

The total ionic strength of the ester compounds having each number of carbon atoms obtained by the measurement was set to 100. The relative value of the ionic strength of the ester compound (by number of carbon atoms) with respect to the total was determined. The relative value was taken as the proportion of the ester compounds having each number of carbon atoms in the ester wax. Further, the number of carbon atoms in the ester compound having the maximum relative value was defined as $C_1$.

The analysis method of the first monomer group and the second monomer group will be described.

First, 1 g of each ester wax example was subjected to a methanolysis reaction at a temperature of 70° C. for 3 hours. The product after the methanolysis reaction was subjected to mass spectrometry by FD-MS to determine the content of long-chain alkyl carboxylic acid having each number of carbon atoms and the content of long-chain alkyl alcohol having each number of carbon atoms.

A method for measuring the distribution of carbon atoms (proportion of carboxylic acids having each number of carbon atoms) in the carboxylic acids constituting the first monomer group will be described.

The proportion of carboxylic acid having each number of carbon atoms was measured by FD-MS "JMS-T100GC (made by JEOL Ltd.)". The measurement conditions were as follows:

Sample concentration: 1 mg/ml (solvent, chloroform)
Cathode voltage: −10 kV.
Spectrum recording interval: 0.4 s.
Measurement mass range (m/z): 10 to 2000.

The total ionic strength of the carboxylic acids having each number of carbon atoms obtained by the measurement was set to 100. The relative value of the ionic strength of the carboxylic acid having each number of carbon atoms with respect to the total was obtained. The relative value was taken as the proportion of the carboxylic acid having each number of carbon atoms in the ester wax. In addition, the number of carbon atoms in the carboxylic acid having the maximum relative value was defined as $C_n$.

A method for measuring the distribution of carbon atoms (proportion of alcohols having each number of carbon atoms) in the alcohols constituting the second monomer group will be described.

The proportion of alcohol having each number of carbon atoms was measured by FD-MS "JMS-T100GC (made by JEOL Ltd.)". The measurement conditions were as follows:

Sample concentration: 1 mg/ml (solvent, chloroform)

Cathode voltage: −10 kV.

Spectrum recording interval: 0.4 s.

Measurement mass range (m/z): 10 to 2000.

The total ionic strength of the alcohols having each number of carbon atoms obtained by the measurement was set to 100. The relative value of the ionic strength of the alcohol having each number of carbon atoms to the total was calculated. The relative value was taken as the proportion of alcohol having each number of carbon atoms in the ester wax. In addition, the number of carbon atoms in the alcohol having the maximum relative value was defined as $C_m$.

The ester wax A will be described.

The number of carbon atoms $C_1$ of the ester compound having the maximum content level in the ester wax A was 44. The ester compound having $C_1$ carbon atoms was 70% by mass in the ester wax A.

The number of different kinds of carboxylic acids in the first monomer group was four. The number of carbon atoms $C_n$ of the carboxylic acid having the maximum content level in the first monomer group was 22. The proportion of the carboxylic acid having $C_n$ carbon atoms in the first monomer group was 70% by mass with respect to total mass of the first monomer group. The total proportion of carboxylic acids having 18 or less carbon atoms was 3% by mass with respect to the total mass of the first monomer group.

The number of different kinds of alcohols in the second monomer group was three. The number of carbon atoms $C_n$ of alcohol having the maximum content level in the second monomer group was 22. The proportion of alcohol having $C_n$ carbon atoms was 70% by mass with respect to total mass of the second monomer group. The total proportion of alcohols having 18 or less carbon atoms was 15% by mass with respect to total mass of the second monomer group.

The distribution of carbon atoms in the ester wax A had only one significant peak in the region having 43 or more carbon atoms.

A mass average molecular weight Mw of the crystalline polyester resin used in each example was 9500, and the melting point was 100° C.

The mass average molecular weight of the non-crystalline polyester resin used in each example was 20000 and the melting point was 110° C.

The $D_{50}$ of strontium titanate used in each example was 20 nm. The $D_{50}$ of titanium oxide used in each example was 20 nm.

The silica used in each example is as follows:

Silica A: (hydrophobic silica, $D_{50}$: 30 nm)

Silica B: (hydrophobic silica, $D_{50}$: 90 nm)

Silica C: (hydrophobic silica, $D_{50}$: 100 nm)

The toner of Example 1 was produced as follows.

First, the raw materials of the toner mother particles were put into a Henschel mixer (made by Mitsui Mining Co., Ltd.) and mixed. The mixture of the raw materials of the toner mother particles was melt-kneaded by a twin-screw extruder. The melt-kneaded product was cooled and then coarsely pulverized with a hammer mill. This coarsely pulverized product was then finely pulverized with a jet pulverizer. This finely pulverized product was classified by size exclusion to obtain toner mother particles. The $D_{50}$ of the toner mother particles was 8.5 μm.

The composition of the raw materials of the toner mother particles was as follows:

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide inclusion compound containing Al and Mg) | (1 pts. mass) |

Next, the temperature of the Henschel mixer with temperature control function was set to 35° C. After the toner mother particles were put into the stirrer, 0.5 pts. mass (with respect to 100 pts. mass of the toner mother particles) of titanium oxide was added, and the mixture was stirred at 35° C. and 900 rpm for 5 minutes. The stirring was stopped, then 2.5 pts. mass of silica A and 0.6 pts. mass of silica B were added to the stirrer (with respect to 100 pts. mass of the toner mother particles) and the mixture was stirred for 10 minutes under the conditions of 35° C. and 900 rpm to obtain the toner of Example 1.

A toner of Example 2 was produced as follows.

The toner mother particles of Example 2 were produced in the same manner as in Example 1 except that the composition of the raw materials of the toner mother particles was changed to the following:

The $D_{50}$ of the toner mother particles of Example 2 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide inclusion compound containing Al and Mg) | (1 pts. mass) |

The temperature of the Henschel mixer with temperature control function was set to 31° C. After the toner mother particles were put into the stirrer, 0.4 pts. mass of titanium oxide (with respect to 100 pts. mass of the toner mother particles) was added, and the mixture was stirred at 31° C. and 900 rpm for 4 minutes. The stirring was stopped, 2.5 pts. mass of silica A and 0.4 pts. mass of silica B (with respect to 100 pts. mass of the toner mother particles) was added to the stirrer, and the mixture was stirred for 8 minutes under the conditions of 35° C. and 900 rpm to obtain the toner of Example 2.

A toner of Example 3 was produced as follows.

The toner mother particles of Example 3 were produced in the same manner as in Example 1 except that the composition of the raw materials of the toner mother particles was changed to the following:

The $D_{50}$ of the toner mother particles of Example 3 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide inclusion compound containing Al and Mg) | (1 pts. mass) |

The temperature of the Henschel mixer with temperature control function was set to 30° C. After the toner mother particles were put into the stirrer, 0.5 pts. mass of titanium oxide (with respect to 100 pts. mass of the toner mother particles) was added, and the mixture was stirred at 30° C. and 900 rpm for 5 minutes. The stirring was stopped, 2.5 pts. mass of silica A and 0.6 pts. mass of silica C (with respect to 100 pts. mass of the toner mother particles) were added to the stirrer, and the mixture was stirred for 9 minutes under the conditions of 30° C. and 900 rpm to obtain the toner of Example 3.

A toner of Example 4 was produced as follows.

The toner mother particles of Example 4 were produced in the same manner as in Example 1 except that the composition of the raw materials of the toner mother particles was changed to the following:

The $D_{50}$ of the toner mother particles of Example 4 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide inclusion compound containing Al and Mg) | (1 pts. mass) |

The temperature of the Henschel mixer with temperature control function was set to 32° C. After the toner mother particles were put into the stirrer, 0.5 pts. mass of strontium titanate (with respect to 100 pts. mass of the toner mother particles) was added to the stirrer, and the mixture was stirred at 32° C. and 900 rpm for 4 minutes and 30 seconds. The stirring was stopped, 2.5 pts. mass of silica A and 0.5 pts. mass of silica C (with respect to 100 pts. mass of the toner mother particles) were added to the stirrer, and the mixture was stirred for 8 minutes and 30 seconds under the conditions of 32° C. and 900 rpm to obtain the toner of Example 4.

A toner of Example 5 was produced as follows.

The toner mother particles of Example 5 were produced in the same manner as in Example 1 except that the composition of the raw materials of the toner mother particles was changed to the following:

The $D_{50}$ of the toner mother particles of Example 5 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide clathrate compound containing Al and Mg) | (1 pts. mass) |

The temperature of the Henschel mixer with temperature control function was set to 30° C. After the toner mother particles were put into the stirrer, 0.4 pts. mass of titanium oxide (with respect to 100 pts. mass of the toner mother particles) was added to the stirrer, and the mixture was stirred at 30° C. and 900 rpm for 5 minutes. The stirring was stopped, 2.5 pts. mass of silica A and 0.5 pts. mass of silica C (with respect to 100 pts. mass of the toner mother particles) were added to the stirrer, and the mixture was stirred for 8 minutes under the conditions of 30° C. and 900 rpm to obtain the toner of Example 5.

A toner of Comparative Example 1 was produced as follows.

The toner mother particles of Comparative Example 1 were produced in the same manner as in Example 1 except that the composition of the raw materials of the toner mother particles was changed to the following:

The $D_{50}$ of the toner mother particles of Comparative Example 1 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide clathrate compound containing Al and Mg) | (1 pts. mass) |

The temperature of the Henschel mixer with temperature control function was set to 30° C. After the toner mother particles were put into the stirrer, 0.4 pts. mass of titanium oxide (with respect to 100 pts. mass of the toner mother particles) was added to the stirrer, and the mixture was stirred at 30° C. and 800 rpm for 5 minutes. The stirring was stopped, 2.5 pts. mass of silica A and 0.4 pts. mass of silica B (with respect to 100 pts. mass of the toner mother particles) were added to the stirrer, and the mixture was stirred for 8 minutes under the conditions of 30° C. and 800 rpm to obtain the toner of Comparative Example 1.

A toner of Comparative Example 2 was produced as follows.

The toner mother particles of Comparative Example 2 were produced in the same manner as in Example 1 except that the composition of the raw materials of the toner mother particles was changed to the following:

The $D_{50}$ of the toner mother particles of Comparative Example 2 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide clathrate compound containing Al and Mg) | (1 pts. mass) |

The temperature of the Henschel mixer with temperature control function was set to 34° C. After the toner mother particles were put into the stirrer, 0.4 pts. mass of titanium oxide (with respect to 100 pts. mass of the toner mother particles) was added to the stirrer, and the mixture was stirred at 34° C. and 900 rpm for 5 minutes. The stirring was stopped, 2.5 pts. mass of silica A and 0.6 pts. mass of silica B (with respect to 100 pts. mass of the toner mother particles) were added to the stirrer, and the mixture was stirred for 10 minutes under the conditions of 34° C. and 900 rpm to obtain the toner of Comparative Example 2.

A toner of Comparative Example 3 was produced as follows.

The toner mother particles of Comparative Example 3 were produced in the same manner as in Example 1 except that the composition of the raw materials of the toner mother particles was changed to the following:

The $D_{50}$ of the toner mother particles of Comparative Example 3 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |

-continued

| | |
|---|---|
| Charge control agent (polysaccharide clathrate compound containing Al and Mg) | (1 pts. mass) |

The temperature of the Henschel mixer with a temperature control function was set to 33° C. After the toner mother particles were put into the stirrer, 0.5 pts. mass of titanium oxide (with respect to 100 pts. mass of the toner mother particles) was added to the stirrer, and the mixture was stirred at 33° C. and 900 rpm for 5 minutes. The stirring was stopped, 2.5 pts. mass of silica A and 0.5 pts. mass of silica B (with respect to 100 pts. mass of the toner mother particles) were added to the stirrer, and the mixture was stirred for 9 minutes under the conditions of 33° C. and 900 rpm to obtain the toner of Comparative Example 3.

A toner of Comparative Example 4 was produced as follows.

The toner mother particles of Comparative Example 4 were produced in the same manner as in Example 1 except that the composition of the raw materials of the toner mother particles was changed to the following:

The $D_{50}$ of the toner mother particles of Comparative Example 4 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Carbon black | (5 pts. mass) |
| Charge control agent (polysaccharide clathrate compound containing Al and Mg) | (1 pts. mass) |

The temperature of the Henschel mixer with a temperature control function was set to 33° C. After the toner mother particles were put into the stirrer, 0.4 pts. mass of strontium titanate (with respect to 100 pts. mass of the toner mother particles) was added to the stirrer, and the mixture was stirred at 33° C. and 900 rpm for 4 minutes. The stirring was stopped, 2.5 pts. mass of silica A and 0.5 pts. mass of silica C (with respect to 100 pts. mass of the toner mother particles) were added to the stirrer, and the mixture was stirred for 10 minutes under the conditions of 33° C. and 900 rpm to obtain the toner of Comparative Example 4.

A toner of Comparative Example 5 was produced as follows.

The toner mother particles of Comparative Example 5 were produced in the same manner as in Example 1 except that the composition of the raw materials of the toner mother particles was changed to the following:

The $D_{50}$ of the toner mother particles of Comparative Example 5 was 8.5 μm.

| | |
|---|---|
| Crystalline polyester resin | (5 pts. mass) |
| Non-crystalline polyester resin | (84 pts. mass) |
| Ester wax A | (5 pts. mass) |
| Charge control agent (polysaccharide clathrate compound containing Al and Mg) | (1 pts. mass) |

The temperature of the Henschel mixer with temperature control function was set to 30° C. After the toner mother particles were put into the stirrer, 0.3 pts. mass of titanium oxide (with respect to 100 pts. mass of the toner mother particles) was added to the stirrer, and the mixture was stirred at 30° C. and 800 rpm for 6 minutes. The stirring was stopped, 2.5 pts. mass of silica A and 0.3 pts. mass of silica C (with respect to 100 pts. mass of the toner mother particles) were added to the stirrer, and the mixture was stirred for 8 minutes under the conditions of 30° C. and 800 rpm to obtain the toner of Comparative Example 5.

A method for measuring the adhesive strength (type A) values will be described.

An aqueous solution of sucrose was prepared by dissolving 227.7 g of sucrose in 113.3 g of deionized water. This aqueous solution of sucrose and 25.53 g of a 10% aqueous solution of a dishwashing detergent (Yashinomi Detergent, Saraya Co., Ltd.) were put in 250 mL plastic bottles and mixed well to prepare a dispersion medium. Then, for each example, 11 g of the toner was added to a previously prepared plastic bottle, and the toner was allowed to stand until the toner settled naturally to prepare a pre-treatment dispersion liquid for each example.

Next, the pre-treatment dispersion liquid was shaken with a turbo mixer under the conditions of 25° C. and 200 rpm for 5 minutes to promote the desorption of titanium oxide from the surface of the toner mother particles. Subsequently, centrifugation was performed at 3700 rpm for 30 minutes. By this centrifugation, the free (desorbed) titanium oxide particles and the toner mother particles still carrying titanium oxide on their surface of were separated from each other. Then, the toner particles on which the titanium oxide particles still remained were suction-filtered, collected, washed with water, and dried to obtain a first group of particles (group A). Then, 5.0 g of these particles was molded into pellets by a molding machine. Then X-ray intensity ($I_a2$) of titanium was measured for these pellets by using a fluorescent X-ray analyzer (Shimadzu XRF-1800). For comparison, the toner of each example was formed into pellets without first undergoing the titanium oxide desorption treatment, and the X-ray intensity ($I_{a1}$) of titanium was measured for these un-desorbed particles. Based on these measured values, the adhesive strength (type A) was determined from the following Formula (1):

$$\text{Adhesive strength (type } A) = (I_{a2}/I_{a1}) \times 100$$

The measurement conditions for obtaining $I_{a1}$ and $I_{a2}$ were as follows:

rhodium target X-ray tube
tube voltage 50 kV
tube current 50 μA
X-ray detector: SC detector
angle range (deg): 10 to 90
speed (deg/min): 20
step angle (deg): 0.1

A method for measuring the adhesive strength (type B) will be described.

(1) A composition of 11 g of toner (each example separately), 56.8 g of deionized water, and 12.8 g of surfactant in was added to a 100 ml beaker and mixed. The mixture was stirred by using a magnetic stirrer until there was no toner layer on the liquid surface to obtain a dispersion liquid.

(2) The dispersion liquid was sonicated by using an ultrasonic cleaner (ASONE US-1R). The conditions for ultrasonic treatment were 25° C., 28 kHz, and 55 W. The dispersion liquid after this ultrasonic treatment was poured into two different centrifuge tubes, and deionized water was added so that the total liquid volume in each centrifuge tube was 45 ml.

(3) Next, these two centrifuge tubes were centrifuged under the conditions of 15 min and 1000 rpm. A centrifuge (HSIANGTAI CN-2060) was used for centrifugation. Then, the supernatant liquid of the two centrifuge tubes was desorbed by decantation, the silica desorbed from the surface of the toner mother particles was removed, and the toner mother particles still carrying the silica on their surface was collected, and deionized water was added so that the total amount of liquid in each centrifuge tube was 45 ml.

(4) The processing of (3) above was repeated twice. Then, 100 ml of deionized water was added to the toner mother particles still carrying silica on their surface, and these were washed, filtered through filter paper (ADVANTEC GC90), and vacuum dried for 8 hours to obtain the particles (group B). Then, 5.0 g of these particles (group B) was molded into pellets by a molding machine. The X-ray intensity ($I_{b2}$) of silicon was measured for these pellets by using a fluorescent X-ray analyzer (Shimadzu XRF-1800). For purposes of comparison, toner of each example was formed into pellets without first undergoing the desorption treatment of the group B particles, and the X-ray intensity ($I_{b1}$) of silicon was measured. Based on these measured values, the adhesive strength (type B) was obtained from the following Formula (2):

$$\text{Adhesive strength (type } B)=(I_{b2}/I_{b1})\times 100$$

The measurement conditions for $I_{b1}$ and $I_{b2}$ were as follows:

rhodium target X-ray tube
tube voltage 50 kV
tube current 50 µA
X-ray detector: FPC detector
angle range (deg): 106 to 112
speed (deg/min): 20
step angle (deg): 0.1

The measurement method for $D_{50}$ will be described.

Values for $D_{50}$ were measured as the volume average primary particle size by using a laser diffraction particle size analyzer (made by Shimadzu (SALD7000)).

The developer used with the Examples will be described.

First, 8.5 pts. mass of the toner (for each example separately) with respect to 100 pts. mass of a ferrite carrier was stirred with a turbo mixer to obtain a formulated developer with each example toner. The surface of the ferrite carrier was coated with a silicone resin having an average particle size of 40 µm.

The evaluation method for fog or fogging in the image forming process will be described.

A commercially available e-studio 5018A (made by TOSHIBA TEC) was used. The e-studio 5018A is provided with a toner recycling system. While operating this recycling system, one hundred thousand (100,000) A4-size documents with a printing coverage ratio of 2.0% were copied in a substantially continuous manner. When the fog value of a blank copy image was maintained below 2.0, the blank copy image was evaluated as acceptable (designated as value "○"). When the fog value of a blank copy image was 2.0 or more, the blank copy image was evaluated as rejected (designated as value "X").

The evaluation method of white streaks will be described.

A commercially available e-studio 5018A (made by TOSHIBA TEC) was used to adjust the temperature of a developer Dc-Sl to be saturated at 47° C. While operating the recycling system, 30,000 sheets were printed on both sides in a hot and humid environment, and the air volume of a cooling fan was adjusted so that the temperature of the developer Dc-Sl was maintained at 47° C.

Next, the difference in image density after the printing of 30,000 sheets was measured. When this image density difference (from initial value) was less than 0.8, the image density was evaluated as acceptable (designated as value "○"). When the image density difference was 0.8 or more, it was evaluated as rejected (designated as value "x"). In general, white streaks are more likely to occur after an image forming apparatus has been left in a stopped state for a prolonged period. For example, first thing in the morning after an office has been closed for the night, white streaks are more likely to occur in an image forming apparatus.

TABLE 1

| | Conditions of External Addition | | | | | | | |
|---|---|---|---|---|---|---|---|---|
| | Stirring Speed (rpm) | Stirring Temperature (° C.) | Total Stirring Time (min) | Stirring Time of Silica (min) | Adhesive Strength Type A (%) | Adhesive Strength Type B (%) | Fog | White Streaks |
| Example 1 | 900 | 35 | 15 | 10 | 94 | 73 | ○ | ○ |
| Example 2 | 900 | 31 | 12 | 8 | 91 | 55 | ○ | ○ |
| Example 3 | 900 | 30 | 14 | 9 | 91 | 78 | ○ | ○ |
| Example 4 | 900 | 32 | 13 | 8.5 | 96 | 66 | ○ | ○ |
| Example 5 | 900 | 30 | 13 | 8 | 92 | 58 | ○ | ○ |
| Comparative Example 1 | 800 | 30 | 13 | 8 | 90 | 32 | ○ | X |
| Comparative Example 2 | 900 | 34 | 15 | 10 | 95 | 88 | X | ○ |
| Comparative Example 3 | 900 | 33 | 14 | 9 | 85 | 70 | X | ○ |
| Comparative Example 4 | 900 | 33 | 14 | 10 | 77 | 83 | X | ○ |
| Comparative Example 5 | 800 | 30 | 14 | 8 | 81 | 25 | X | X |

Table 1 illustrates the evaluation results of the toners in each example.

The toners of Examples 1 to 5 have both the adhesive strength (type A) and the adhesive strength (type B) within a specified range. These toners were also acceptable with respect to both fog and white streaks.

On the other hand, the toners of Comparative Examples 1 to 5 did not reach the acceptance criteria for both fog and white streaks at the same time.

While certain embodiments have been described, these embodiments have been presented by way of example only, and are not intended to limit the scope of the disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. A toner, comprising:

toner base particles comprising a binder resin, an ester wax, and a colorant; and an external additive adhering to a surface of the toner base particles and comprising a titanium oxide and silica, wherein a first adhesive strength between the external additive and the toner base particles is in a range of 90 to 100% when measured as a ratio $I_{a1}/I_{a2}$ multiplied by 100, where $I_{a2}$ is an X-ray intensity of titanium measured for toner base particles processed as follows in a first processing:

an aqueous liquid containing the toner is shaken for 5 minutes at 25° C. and 200 rpm, desorbed external additive is removed by centrifugation, and then remaining toner base particles are dried before measurement of X-ray intensity, and $I_{a1}$ is an X-ray intensity of titanium measured for toner base particles not processed according to the first processing;

a second adhesive strength between the external additive and the toner base particles is in a range of 50 to 80% when measured as a ratio $I_{b1}/I_{b2}$ multiplied by 100, where $I_{b2}$ is an X-ray intensity of silicon measured for toner base particles processed as follows in a second processing:

an aqueous liquid containing the toner is sonicated at 25° C., 28 kHz, 55 W, desorbed external additive is removed by centrifugation, and then remaining toner base particles are dried before measurement of X-ray intensity, and $I_{b1}$ is an X-ray intensity of silicon measured for toner base particles not processed according to the second processing;

the ester wax is formed by condensation reaction between a first monomer group including at least three different types of carboxylic acids and a second monomer group including at least two different types of alcohols;

the proportion of carboxylic acids in the first monomer group having 18 or fewer carbon atoms is 5% or less by mass of the total mass of the first monomer group; and the proportion of alcohols in the second monomer group having 18 or fewer carbon atoms is 20% or less by mass of the total mass of the second monomer group.

2. The toner according to claim 1, wherein at least a part of the binder resin is a crystalline polyester resin.

3. The toner according to claim 1, wherein at least a part of the binder resin is a crystalline polyester resin.

4. The toner according to claim 1, wherein the colorant is carbon black, a pigment, or a dye.

5. The toner according to claim 1, further comprising:

a charge control agent.

6. The toner according to claim 1, wherein the volume average primary particle size of the toner base particles is in a range of 4 microns to 12 microns.

7. The toner according to claim 1, wherein the ester wax is in a range of 3 to 13% by mass of the toner base particles.

8. The toner according to claim 1, wherein the binder resin comprises a crystalline polyester resin and a non-crystalline polyester resin, and the crystalline polyester resin is 5 to 25% by mass of the toner base particles.

9. The toner according to claim 1, wherein the titanium oxide is strontium titanate.

10. A toner cartridge, comprising:

a container storing a toner according to claim 1.

11. An image forming apparatus, comprising:

a toner cartridge storing a toner according to claim 1.

12. A toner, comprising:

toner base particles comprise a binder resin, an ester wax, and a colorant;

a titanium oxide additive adhering to a surface of the toner base particles and comprising a titanium oxide; and a silica additive adhering to the surface of the toner base particles, wherein the binder resin comprises a crystalline polyester resin and a non-crystalline polyester resin, the ester wax is formed by a condensation reaction including three different types of long-chain alkyl carboxylic acids and two different types of long-chain alkyl alcohols, the proportion of long-chain alkyl carboxylic acids in the first monomer group having 18 or fewer carbon atoms is 5% or less by mass of the total mass of the first monomer group, the proportion of long-chain alkyl alcohols in the second monomer group having 18 or fewer carbon atoms is 20% or less by mass of the total mass of the second monomer group, and the titanium oxide additive is mixed with the toner base particles before the silica additive is mixed with the toner base particles.

13. The toner according to claim 12, wherein the titanium oxide additive is mixed with the toner base particles at 30° C. to 35° C. for at least 4 minutes before the silica additive is added.

14. The toner according to claim 13, wherein the silica is mixed with the toner base particles and the titanium oxide additive for at least eight minutes.

15. The toner according to claim 12, wherein the crystalline polyester resin is 5 to 25% by mass of the toner base particles.

16. The toner according to claim 12, wherein the titanium oxide additive is strontium titanate or titanium dioxide.

17. The toner according to claim 12, wherein the silica additive comprises a spherical silicon dioxide particle.

18. A toner cartridge, comprising:

a container storing a toner according to claim 12.

19. An image forming apparatus, comprising:

a toner cartridge storing a toner according to claim 12.

* * * * *